United States Patent [19] | [11] 4,115,498
Kissell et al. | [45] Sep. 19, 1978

[54] METHOD AND APPARATUS FOR MOLDING ARTICLES FROM FIBROUS MATERIAL

[75] Inventors: Ronald E. Kissell, Alexandria; Ulysses T. Gambill, Granville, both of Ohio

[73] Assignee: Owens-Corning Fiberglas Corporation, Toledo, Ohio

[21] Appl. No.: 661,893

[22] Filed: Feb. 27, 1976

[51] Int. Cl.[2] .......... B29D 23/00

[52] U.S. Cl. .......... 264/119; 264/165; 264/236; 264/137

[58] Field of Search .......... 264/109, 119, 122, 118, 264/165, 236, 137

[56] References Cited

U.S. PATENT DOCUMENTS

| | | | |
|---|---|---|---|
| 3,093,532 | 6/1963 | Miller et al. | 264/258 |
| 3,150,025 | 9/1964 | Slayter et al. | 425/373 |
| 3,377,220 | 4/1968 | Berger et al. | 264/122 |
| 3,518,157 | 6/1970 | Terry et al. | 264/119 |
| 3,535,178 | 10/1970 | Parlin et al. | 264/119 |
| 3,549,738 | 12/1970 | Troyer | 264/119 |
| 4,029,461 | 6/1977 | Lacon | 156/498 |

*Primary Examiner*—Robert F. White
*Assistant Examiner*—James R. Hall
*Attorney, Agent, or Firm*—Charles R. Schaub; Ronald C. Hudgens; Paul J. Rose

[57] ABSTRACT

Method of continuously molding articles from a fibrous material containing a hardenable bonding material wherein a quantity of fibrous material is supplied to a forming member that engages the surface of the fibrous material and shapes the material into the desired cross-sectional shape. The exterior surface of the shaped fibrous material is then heated so that the bonding material on the exterior surface of the fibrous material cures to form a hard, tough skin on the exterior surface of the fibrous material. Then, additional heat is supplied to the fibrous material to cure the remaining uncured bonding material on the fibrous material so the fibrous material will be held in the desired shape by the cured bonding material.

8 Claims, 42 Drawing Figures

101
102
103
104
105
108
109
111
113
115
116
118
120
121
122
124
125
150
151
152
153
154
155
156
157
160
161
165
166

METHOD AND APPARATUS FOR MOLDING ARTICLES FROM FIBROUS MATERIAL

To form the desired cylindrical shape a number of molding methods have been used. One of the more successful methods has been to place the fibrous material in a corrugated matched mold to deform the material into a corrugated shape. Then heat is added to the corrugated mold to cure the hardenable bonding material on the fibrous material so that it will remain in the corrugated shape. When the bonding material has completely cured, the fibrous material is removed from the corrugated mold as a corrugated sheet. Then the corrugated sheet is cut so that the half round or cylindrical humps of the corrugation are cut out to form one half of a cylindrical piece of insulation. It can be diffficult to cut the half round sections from the corrugated sheet as the corrugated molds do not produce a uniform size product. In addition, the insulation can be torn or otherwide deformed when it is forced into the corrugations during the molding of the insulation. This also acts to produce a product that is not very uniform or useable directly from the molds. Therefore, the pieces must be trimmed to obtain the desired shape. And, even after trimming, the sections of the insulation are not always the desired shape. Of course, the cutting and trimming steps add to the cost of making the sections of half round insulation. Usually two of the half round sections are joined together to form a cylindrical section of insulation. The pieces can be placed together around the object they are to insulate or they can be placed together and then slipped onto the object they are to insulate. In either case, a suitable securing means must be employed to keep the two pieces together as a single section of cylindrical insulation. However, the joint between the two pieces of insulation is frequently not very good as the edges of the cut pieces of insulation do not always fit together tightly. Therefore, significant thermal leaks can exist if the seams between the two pieces of insulation are not very good or if the seams have not been properly filled or modified to eliminate the gaps in the insulation.

Another way to form the cylindrical sections of insulation is to wind insulation on a mandrel and then bring a mold around the insulation to produce the desired cylindrical shape (United States Patent 3,053,715 is an example of this system). During the molding step the bonding material must be cured by the addition of heat so that insulation will be held in the molded shape by the cured bonding material. This method is similar to the previous method in that the molds do not always produce dimensionally accurate sections of insulation. Therefore, trimming or other steps are frequently necessary.

In both of these methods of making cylindrical insulation the dimensional accuracy of the molded parts can vary significantly. These variations require trimming or other steps to produce an acceptable product. Also the product can only be made in certain lengths as the sizes of the molds dictate the length of the insulation. Further, since the molds must be retained around the insulation until the bonding material on the insulation has cured, the previously described processes are relatively slow. It is necessary to wait until the insulation has been completely molded and cured before additional insulation can be supplied to be molded. Therefore, expensive equipment must be tied up while the insulation is being cured before the molds can be used again. All of these features act to reduce the efficiency of this type of discontinuous molding operation for making cylindrical insulation products.

SUMMARY OF THE INVENTION

An object of the invention is to provide an improved method of molding articles from a fibrous material containing a hardenable bonding material.

Another object of the invention is to provide an improved method of molding a more uniform article from fibrous material.

Yet another object of the invention is to provide an improved method of continuously molding articles from fibrous material.

An additional object of the invention is to provide an improved method of continuously molding one piece pipe insulation from fibrous material.

Still another object of the invention is to provide an improved method of molding a longitudinal seam in the one piece pipe insulation.

In a broad sense these and other objects of the invention are attained by using apparatus having a source of supply of fibrous material containing a hardenable bonding material and a forming member for shaping the supplied fibrous material to the desired cross-sectional shape. A means for advancing the shaped fibrous material is then used to advance the fibrous material to a heated chamber where the bonding material on the fibrous material is hardened by the heat supplied in the chamber. The fibrous material is then cooled to completely harden the bonding material on the fibrous material and the hardened bonding material holds the fibrous material in the desired shape. The molded fibrous material can then be cut to length or further processed depending on the end use for the molded fibrous material.

Other objects and advantages of the invention will become apparent as the invention is described hereinafter in more detail with reference made to the accompanying drawings.

DESCRIPTION OF THE PREFERRED EMBODIMENTS

Figures 1, 2, 3:
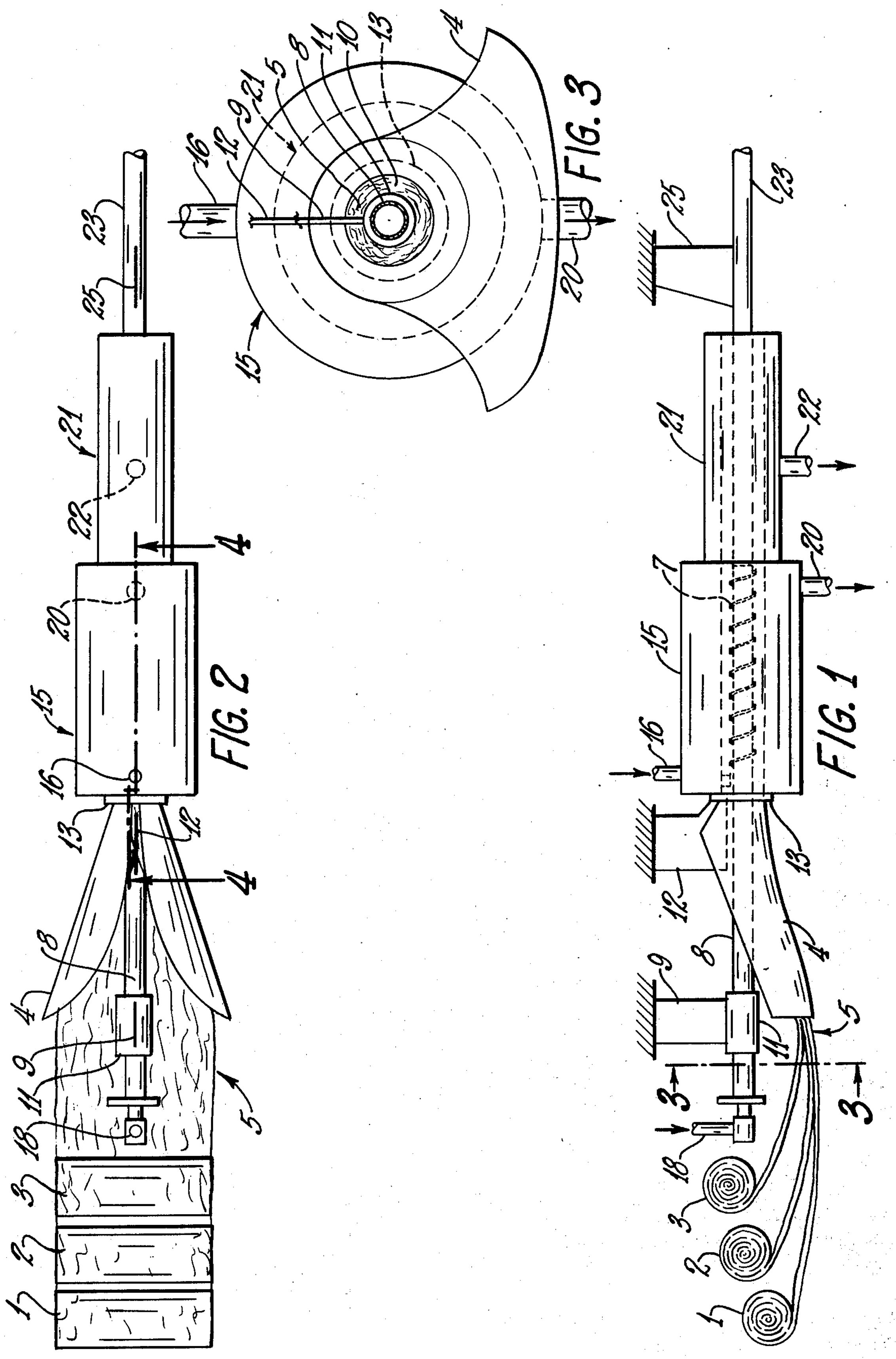
FIG. 1 is a side view of the apparatus used to continuously mold articles from a fibrous material.
FIG. 2 is a top view of the apparatus used to continuously mold articles from a fibrous material.
FIG. 3 is a cross sectional view of the apparatus shown in FIG. 1 where the cross section is taken along line 3—3.

This invention can be best understood by referring to the attached drawings. FIGS. 1, 2 and 3 show the apparatus for forming a continuous section of cylindrical insulation. Roll of insulation 1, roll of insulation 2 and roll of insulation 3 are unwound and stacked on top of one another to form a continuous body of fibrous insulation 5. The insulation has a hardenable material or a binder material on it that can be changed to the hardened state by the addition of heat. The bonding material or binder material is usually a thermoset material, suitable for use on fibrous materials, that can be cured or hardened by the addition of heat. When the thermoset material is placed on the insulation it does not affect the insulation to any great extent as it is just a flexible coating material. However, when the bonding material on the insulation is subjected to the proper level of heat the bonding or binder material cures into a hard tough coating material that provides the insulation with some structural rigidity. In practice it has been found that a thermoset binder material having phenol, formaldehyde and urea as its main components works very well. U.S. Pat. No. 3,684,467 describes such a binder material that could be used with this invention. In addition, U.S. Pat. Nos. 2,763,009; 3,019,477; and 3,337,669 show how this type of binder material can be applied to and used on a fibrous material. Thermoplastic bonding materials can also be used on the insulation but it has been found that they are not as easy to use on the fibrous material. In practice it has been found that a fibrous glass insulation material works very well. The fibrous insulation is fed into a forming member or forming shoe 4 which takes the flat body of insulation and forms it into a cylindrical shape. The insulation is formed so that the exterior sides of the insulation come together at the top of the cylindrical shape and form a longitudinal seam. As the insulation is formed into a cylindrical shape by the forming shoe 4 it is also being formed around a rotating mandrel 8 which passes through the hollow center portion of the cylindrical insulation. The rotating mandrel 8 is supported by a bearing 11 which is connected to a mounting support 9. A portion of the exterior surface of the rotating mandrel 8 has a thread or helix 7 wound around the exterior surface.

As the insulation 5 is formed into a cylindrical shape by the forming shoe 4 the helical ridge 7 on the rotating mandrel 8 engages the center of the insulation and causes the insulation to be advanced along the helix 7 as the mandrel rotates. There is a seam former 12 which projects into the seam formed by the insulation as it is formed into a cylindrical shape. The seam former 12 helps to form a straight seam in the insulation and also helps to prevent the insulation from twisting or rotating as it advances along the helical ridge 7 on the exterior of the rotating mandrel.

As the insulation advances along the rotating mandrel it is pushed into a cylindrical chamber or housing 15.

The initial portion of the cylindrical housing contains a cooling coil 13. The cooling coil acts to keep the insulation at a very low temperature so that the binder material on the insulation remains in an uncured state. The cooling coil 13 is made of a hollow tube or a number of hollow tubes and is positioned around the advancing insulation 5. Water, air or another suitable substance can be circulated in the hollow tube portion of the cooling coil 13 to keep the insulation 5 cool. In practice it has been found that the insulation, that comes into contact with the cooling coil 13 should be kept at approximately 70°-200° F. for the best results. This temperature range keeps the binder on the insulation from curing and is usually around the temperature of the insulation supplied to the forming shoe.

It may also be desirable to cool the forming shoe 4 that forms the insulation 5 into a cylindrical shape. The main reason for cooling the forming shoe will be to remove any heat that may build up due to friction as the insulation advances along the forming shoe. This will help to ensure that the binder on the insulation does not become precured as it passes through the forming shoe. Air, a cool fluid or any other suitable means could be used to cool the forming shoe 4. In practice it has been found that if the forming shoe 4 is cooled so that it stays in the temperature range of 70°-200° F. this will keep the binder on the insulation from precuring.

As the insulation moves from the cooling coil 13 the insulation passes into a heated chamber 15. The heated chamber 15 exposes the insulation 5 and the binder on the insulation to a temperature high enough to cure the binder on the insulation. The heated chamber 15 also has cylindrical dies, located along the interior length of the chamber, that maintain the insulation in a cylindrical form while the insulation is being subjected to the heat in the chamber. A substantial portion of the heat in the chamber 15 is provided by hot air which is supplied to the chamber through the passageway 16. The hot air from the passageway 16 surrounds the exterior of the insulation and the hot air is drawn through the insulation and exits through the passageway 20. In addition hot air is fed through the passageway 18 into the center of the rotating mandrel 8. The hot air from the passageway 18 then escapes from the center of the mandrel through small orifices (see FIG. 4) which are located in that portion of the mandrel that is in the heated chamber 15. The hot air from the center of the mandrel also passes through the insulation and is drawn out of the chamber through the passageway 20. The heat that is supplied to the insulation in chamber 15 acts to cure or harden the binder on the insulation and this forms a rigid cylindrical insulation product. Since it is the curing of the binder that gives the insulation product its structural integrity and allows the insulation to remain in a cylindrical form it is very important that the binder is cured in the heated chamber 15.

As the insulation advances from the heated chamber 15 it passes into a cooling chamber 21. In the cooling chamber 21 the cylindrical insulation is supported on a stationary mandrel 23. In addition, there is a metal sleeve with holes or slots located in the cooling chamber and the metal sleeve fits around the exterior of the cylindrical insulation to hold the insulation in a cylindrical shape while the insulation is in the cooling chamber 21. Air is drawn from the hot insulation in the cooling chamber 21, through the passageway 22, and this causes the insulation in the chamber 21 to be cooled. As the insulation is pushed from the cooling chamber 21 it advances past a splitter 25 which acts to reopen the seam in the insulation. The splitter 25 also acts as a support that helps to hold up the stationary mandrel 23.

The roll of insulation 1, the roll of insulation 2 and the roll of insulation 3 used with this apparatus would normally be of the same density and width and the insulation would have a quantity of uncured binder on it. However, the insulation in the three rolls could vary in density. It is also possible that the insulation could vary in width. These variations in the insulation supplied to the forming shoe would help to accommodate various size and thermal characteristics desired in the end product. It should also be noted that one roll of insulation having a greater thickness could be used or that almost any number of rolls of insulation could be fed into the forming shoe.

Figure 4:
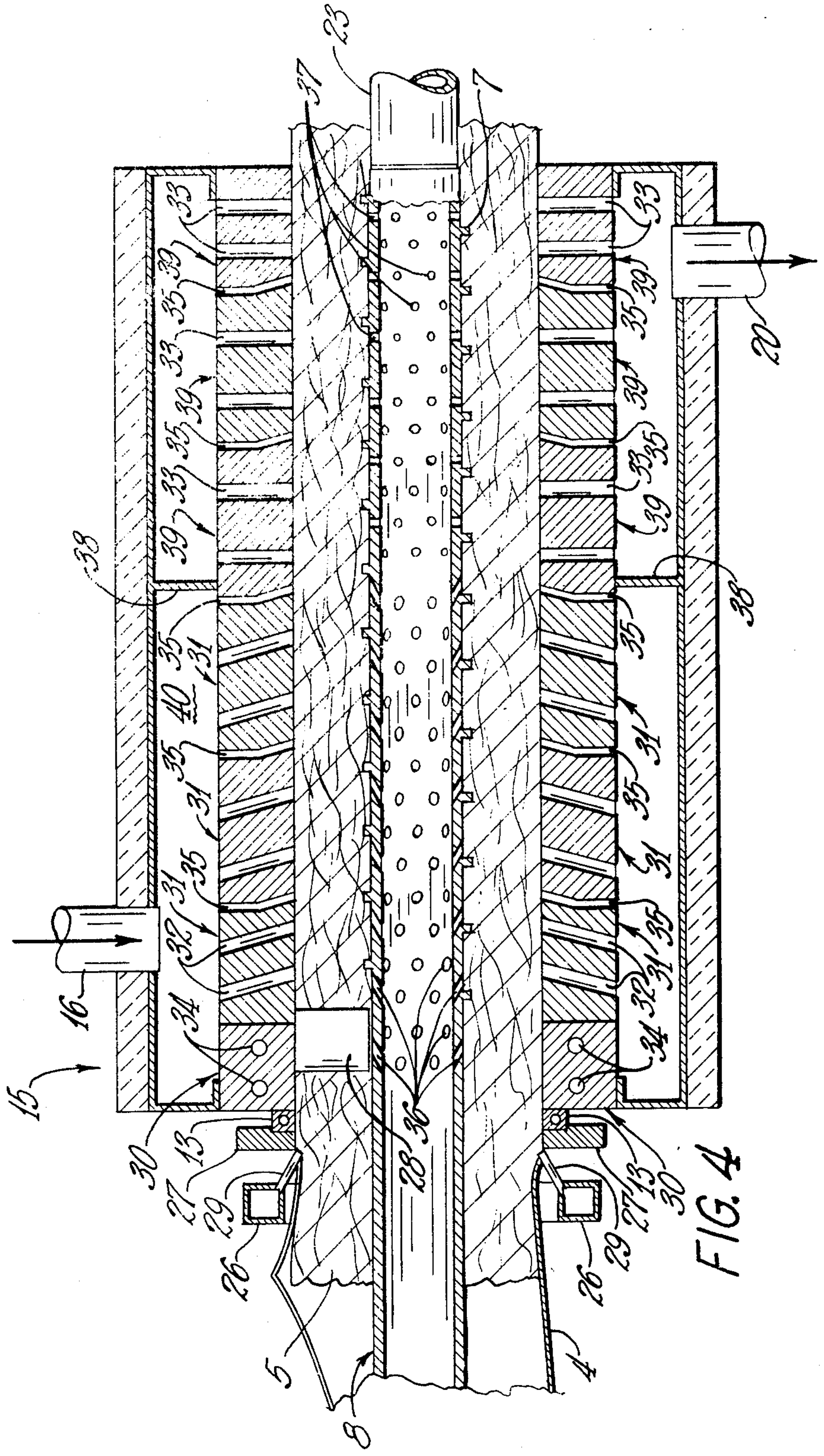
FIG. 4 is a cross sectional view of the heated chamber where the cross section is taken along line 4—4 shown in FIG. 2.

FIG. 4 shows a cross section of the heated chamber 15. In this figure the cylindrical insulation 5 is pulled along the forming shoe 4 by the rotating mandrel 8. As the insulation is pulled towards the heated chamber 15, cool air from chamber 26 is forced along the passageway 29 and the air exits from the passageway on top of the insulation 5, in the area of the cooling coil 13. The air in chamber 26 helps to cool the insulation 5 that is in the forming shoe 4 and the air discharged from the passageway 29 helps to keep the insulation 5 from binding when it comes into contact with the cooling coil 13. The passageway 29 is relatively small and provides only a relatively small space for the air in chamber 26 to pass through. Thus, to remove the air supplied under pressure to chamber 26 the air must move at a relatively high velocity through the passageway 29. The high speed air that is coming out of the passageway 29 helps to prevent the insulation 5 from binding or sticking when it advances into the region of the cooling coil 13. Since the air is traveling in the direction that the insulation 5 is advancing, when the air leaves the passageway 29 it also acts to help advance the insulation. The direction of the air exhausted from the passageway 29 also helps to prevent any air from escaping from the front of the heated chamber 15.

Next the insulation 5 advances into the region of the cooling coil 13 which encompasses the exterior surface of the cylindrical insulation. Cool air, water or another suitable medium is circulated through the hollow tubing that forms the cooling coil 13 and this helps to keep the insulation 5 cool. In practice it has been found that if the insulation 5 is kept at approximately 70°-200° F. the binder on the insulation will remain in the uncured state and the cooling coil will function effectively. The cooling coil 13 is secured in position along the path of the advancing insulation 5 by means of a flange 27.

As the insulation 5 moves past the cooling coil 13 it enters the heated chamber 15. The heated chamber 15 has a series of dies on the inside that hold the insulation in a cylindrical shape. The first die 30 that the insulation comes into contact with is a heated die. This die 30 is usually heated by means of electrical heaters 34. The function of the first die 30 is to provide a hot enough surface to cause the binder material to cure quickly and to form a hard skin on the exterior surface of the insulation. The hard skin that is formed on the exterior surface of the insulation by the heated die 30 helps to hold the insulation in a cylindrical shape as it moves along the heated chamber. Attached to the heated die 30 is a blade 28 which receives heat by conduction from the die 30. The blade 28 depends from the heated die into the chamber so that the edges of the insulation that form the seam in the cylindrical insulation come into contact with the blade 28 as the insulation advances and the heat from the blade causes a skin cure to be produced on the surfaces of the insulation that form a seam. The blade 28 is shown forming a straight butt seam in the insulation. However, it should be noted that different types or configurations of seams could be formed in the insulation. For example, a tongue and groove or similar type of interlocking seam could be formed into the insulation by a properly shaped blade. This type of seam forming method has the advantage that a match fit seam is formed on the insulation where a hole or depression on one side of the seam will result in a corresponding bump on the other side of the seam that fits into the hole. Thus, a very good sealing seam is formed in the insulation. The skin cure on the seam, produced by the blade, also helps to keep the insulation that forms the seam in place as the insulation advances. The heated blade 28 further helps to keep the insulation 5 from rotating as the insulation is advanced by the rotating mandrel 8.

When the insulation 5 first enters the heated chamber 15 it is being compressed so it will fit between the dies located in the heated chamber. Thus, when the insulation comes into contact with the heated die 30, the blade 28 and the mandrel 8, it is being compressed and the compressed insulation would create a friction force or rubbing effect on whatever the insulation comes into contact with. This friction or rubbing is very important because it will remove any binder material that is deposited on the heated die 30, the blade 28 or the mandrel 8. If the binder material is not removed by the advancing insulation a layer of binder material would soon build up on these parts and be cured into a hard layer by the heat in the chamber 15. If a layer of binder was to build up on the heated die 30 or the heated blade 28 this would reduce the thermal effectiveness of these parts and a good skin cure would not be formed on the insulation 5. Also the dimension or size of the heated die 30 and heated blade 28 would change as the layer of binder built-up and consequently the dimensions of the finished insulation produce would vary with the amount of binder buildup. On the mandrel the binder buildup could get so thick that it could eventually fill up the space between the helical ridges 7 on the mandrel. Of course when this would happen the mandrel 8 would no longer be capable of advancing the insulation 5. In addition the build up of binder would create more friction and increase the amount of force necessary to advance the insulation. Therefore, it is very important that the insulation 5 be compressed enough when it enters heated chamber 15 that it can scrape away any build up of binder off the heated die 30, the heated blade 28 and the mandrel 8.

After the insulation 5 has received a skin cure, in the beginning section of heated chamber 15, the insulation no longer has to scrape off binder buildup because the sections of insulation 5 that deposit binder on the apparatus have been given a skin cure. Thus, after the insulation has been skin cured there is very little if any sticky uncured binder that comes into contact with the parts of the insulation forming apparatus.

To form a good skin cure on the advancing insulation 5 it is very important that the surface of the insulation be heated to a suitable temperature in the area where the skin cure is being applied. This temperature should be high enough that the skin cure will be accomplished quickly and a good thick skin formed. In the present case the insulation 5 passes from the cooling coil 13 into the heated chamber where the skin cure is applied to the insulation 5. In practice it has been found that if the heated die 30 is at a temperature in the range from 600°-800° F. that this temperature will work very well to skin cure the binder on the insulation. Of course since the heated blade 28 is in direct contact with the heated die 30 it will also be approximately as hot as the heated die. Thus, the heated blade 28 will provide a good skin cure on the insulation that forms the seam.

Using this method the skin is formed very quickly on the insulation. An advantage of this system is that the binder material is cured so rapidly there is very little opportunity for the binder material to create a sticking problem. The binder is cured so quickly by the high temperature that the sticky uncured binder is not in contact with the heated die 30, the heated blade 28 or any other component for a long enough period of time, to create a sticking problem. This method of curing has the additional advantage in that the skin cure is accomplished so quickly that the skin cure zone can be fairly short. Thus, the high temperature zone of the heated chamber 15 is very short and this reduces the area where problems can occur when applying a skin cure to the insulation 5.

The hot air supplied to the mandrel 8 through the passageway 18 is usually at a temperature in the range of 500–700° F. Therefore, the temperature of the mandrel is usually a little lower than that of the heated die 30. Thus, the interior region of the insulation 5 that is in contact with the mandrel does not experience as high a temperature as the exterior region of the insulation. Thus, the binder material on the interior surface of the insulation does not receive as thick of a skin cure as does the exterior surface of the insulation. However, it has been found that an adequate skin will be formed on the interior region of the insulation by using the hot air in the mandrel. If a higher degree of skin cure is required on the interior surface of the insulation, higher temperature air can be supplied to the mandrel 8 or the mandrel could be heated by another source of heat in addition to the use of the hot air.

Alternatively, it would be possible to supply insulation 5 that had already received a skin cure on its upper and lower surfaces and along the edges of the insulation. Then when the insulation was fed into the forming shoe a cylindrical shape of skin cured insulation would be formed. This would eliminate the need for skin curing the insulation in the heated chamber. Thus, the heated die and heated blade normally found in the heated chamber would be eliminated as they would no longer be needed to skin cure the insulation. Alternatively, the heat normally supplied to the heated die and heated blade would not be needed when pre-skin cured insulation was supplied to the forming shoe. Thus, pre-skin cured insulation could be used in this apparatus instead of applying a skin cure to the insulation in the heated chamber.

In the rest of the chamber 15 there are dies 31 that are positioned along the path of travel of the advancing insulation. The dies 31 act to shape the insulation and hold the insulation in a cylindrical form and they also supply heat to the insulation. There is a plenum chamber 40 around the dies and heated air is supplied to the plenum chamber 40 through the passageway 16. The heated air supplied to the passageway 16 then passes through slanted passageways or holes 32 that are positioned in the dies 31. The heated air also passes through slots 35 that exist between the dies 31 that are in adjacent relationship. The heated air that passes through the holes 32 and through the slots 85 between the dies 31 strikes the insulation 5 that is being advanced through the heated chamber and cures the remaining uncured binder on the insulation. At the same time heated air is being released from the slanted passageways or holes 36 in the mandrel 8 and this heated air also penetrates into the insulation 5 to cure the binder.

Since the holes 32 in the dies 31 and the slots 35 between the dies 31 are at an angle and the holes 36 in the mandrel 8 are at an angle, the air emerging from these holes supplies a forward force on the insulation 5 as the insulation advances through the heated chamber. In addition, a layer of air builds up between the dies 31 and the exterior surface of the insulation and between the mandrel 8 and the interior surface of the insulation. This layer of hot air keeps the insulation 5 from rubbing against the dies 31 and the surface of the mandrel 8. Thus, the layer of air helps to reduce any friction or drag that may exist between the insulation 5 and the dies 31 or the mandrel 8 and thereby reduce the force needed to advance the insulation. Although the holes 32 in the dies 31 and slots 35 between the dies 31 have been shown to be at an angle they could also be made straight or non-angled. This would reduce the cost of making the holes 32 and slots 35 and would not greatly reduce their efficiency.

It should be noted that the slanted passageways or holes 32 and slots 35 are small in size so that the heated air from plenum chamber 40 passes through the holes 32 and slots 35 at a velocity high enough to move the insulation away from the dies 31 and to form a layer of air between the insulation 5 and the dies 31.

The hot air supplied through the passageway 16 heats the dies 31 and also passes through the dies to the insulation and this additional heat helps to cure the remainder of the uncured binder on the interior of the shaped insulation. This curing process operates at lower temperatures than the skin cure and cures a larger portion of the binder, than cured by the skin cure, so that a longer period of time is required for this portion of the curing operation. Also in this portion of the heated chamber a different type of cure is desired. This is a depth cure that does not harden the binder material as much as the binder in the skin cured portion of the insulation. Instead, the depth cure acts to cure the binder on the interior of the insulation so that it will retain its shape after it is removed from the dies. Thus, it is very important that the hot air and heat from the dies 31 penetrate into the interior of the insulation to cure the binder material.

The dies 31 in this example have been shown as being heated by the hot air that passes through the holes 32 in the dies. However, it should be understood that an additional source of heat could be used to heat the dies 31 if necessary. This could be an electrical heating device as shown in the heated die 30 or any other suitable heating means. Of course, this type of additional heating would supply additional heat to help cure the binder material on the insulation that is not cured by the skin cure portion of the heated chamber.

It is very important that the heated air supplied through the mandrel 8 and through the passageway 16 penetrates the insulation so that the binder on the interior of the insulation as well as the exterior surfaces of the insulation is cured. To accomplish this a partition 38 is positioned at the end of the plenum chamber 40. Thus, when heated air is supplied through the passageway 16 it fills the plenum chamber 40 and passes through the holes 32 in the dies 31 and slots 35 between the dies 31, that are located within the plenum chamber 40 in the first portion of the heated chamber 15. Heated air is, therefore, not supplied to the dies 39 along the rest of the length of the heated chamber 15. However, the outlet 20 where the heated air is removed from the heated chamber 15 is located at the end of the chamber where the dies 39 do not receive heated air. This arrangement forces the heated air supplied through the passageway 16 to be drawn through the insulation 5 so that it can be exhausted through the passageway 20. In addition, dies located in the region where the hot air is exhausted have straight holes so that the hot air which penetrates the insulation can be drawn through the straight holes 33 in the dies 39 and then exhausted out the passageway 20.

The arrangement of the hot air inlet 16 and the hot air outlet 20 helps to ensure that the air within the heated chamber 15 moves in the same direction as the direction of the advancing insulation 5. This type of air movement keeps the hot air within the chamber 15 as the direction of movement of the air tends to prevent it from going out the front of heated chamber 15. Thus, the hot curing air remains in the heated chamber 15 as long as possible to cure the insulation and also any smoke or fumes are retained in the chamber 15 until they are exhausted out through the passageway 20. Since most of the smoke and fumes are exhausted through the passageway 20 a suitable environmental control device can be used on the exhaust gases in this passageway to control the environment in the area where the insulation is being cured. This type of hot air movement also increases the amount of cure in the insulaton as the insulation advances through the heated chamber 15. Thus, the rate of cure in the insulation 5 can also be controlled with this type of hot air movement through the heated chamber 15. In addition, by keeping the air in the heated chamber 15 moving in the direction that the insulation travels the air helps to advance the insulation. The hot air is exhausted through the passageway 20 by a negative pressure that is created and the negative pressure provides a suction force that also helps to advance the insulation as well as exhaust the hot air.

Figure 5:
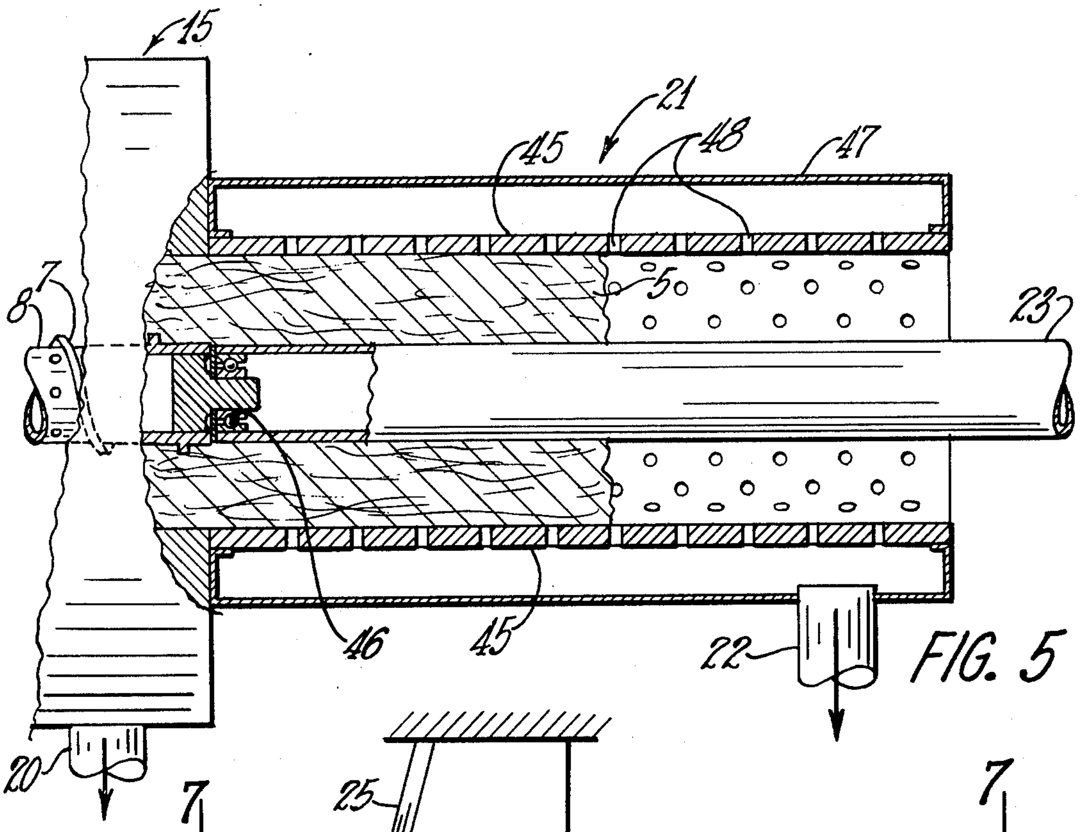
FIG. 5 is a cross section of the cooling chamber that is used to cool the heated fibrous material.

As the insulation 5 (in FIG. 5) passes from the heated chamber 15 it enters a cooling chamber 21 where the insulation is cooled. The insulation 5 is supported on stationary mandrel 23 as it moves through the cooling chamber 21. The stationary mandrel 23 is connected to the rotating mandrel 8 by means of rotating bearing 46. The bearing 46 allows a rotating mandrel 8 to push the insulation 5 along its path for forward advancement as the helical flange on the mandrel rotates. The insulation then slides onto stationary mandrel 23 when it enters the cooling chamber 21. It should be noted that the insulation 5 is advanced along the stationary mandrel 23 by the insulation that is being advanced by the rotating mandrel. The section of rotating mandrel 8 supplies all the force that is necessary to pull the insulation 5 into the forming shoe 4 and to push the insulation 5 through chambers 15 and 21.

All the insulation 5 in the cooling chamber 21 is surrounded by a metal sleeve 45 which acts to hold the insulation 5 in a cylindrical shape while the insulation advances through the cooling chamber 21. Around the metal sleeve there is an exhaust chamber 47 with an outlet passageway 22 located at the far end of the exhaust chamber. The metal sleeve 45 that surrounds the insulation 5 has a series of holes or slots 48 positioned along the length of the sleeve. When air is removed from the passageway 22 by means of an exhaust fan or a vacuum it causes the hot air in the insulation 5 to move through the holes or slots of the metal sleeve 45 and into the exhaust chamber 47. The hot air then moves along the chamber 47 until it is exhausted through the passageway 22. As heat is removed from the insulation in the cooling chamber 21 the binder on the insulation completes its cure and a relatively stiff or rigid piece of insulation is formed. The air withdrawal process used in the cooling chamber 21 has the additional advantage in that any smoke or odors that remain in the insulation, as a result of the binder being cured, will be removed at this point of the operation. Of course, a suitable environmental control device could be used at this point to remove any smoke or odors that remain.

Figure 6:
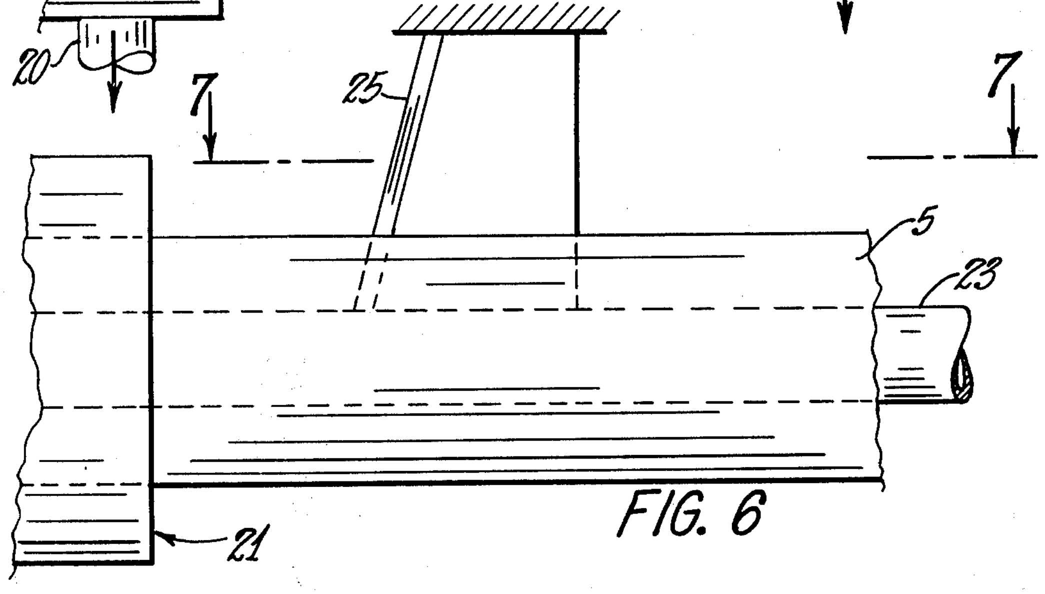
FIG. 6 is a side view showing the splitter that reopens the seam on the fibrous material and the molded fibrous material.
Figure 7:
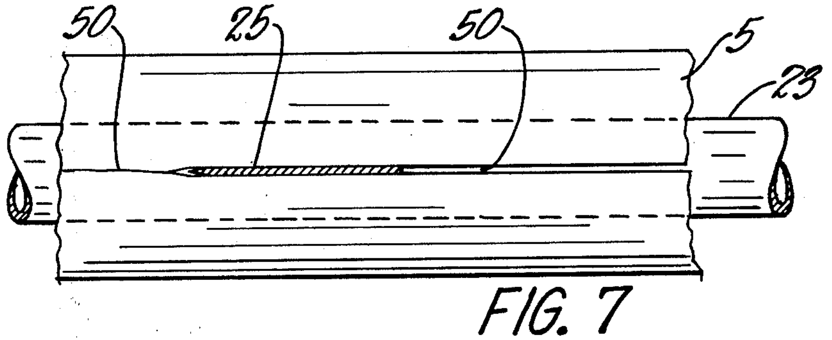
FIG. 7 is a cross sectional view of the splitter, taken along line 7—7 of FIG. 6, where the splitter is shown reopening the seam in the fibrous material.

FIGS. 6 and 7 show the insulation 5 as it moves from the cooling chamber 21. As the insulation advances it comes into contact with the splitter 25 which projects from a support to the stationary mandrel 23. The splitter 25 is used to reopen the seam 50 that is formed in the insulation 5 when it was originally put into cylindrical form by the forming shoe 4. Frequently as the insulaton 5 passes through the heated chamber 15 and the cooling chamber 21 the insulation is compressed so that the seam is closed and no longer exists. In addition, the binder on the seam cures and also acts to hold the seam tightly together. Therefore, the insulation 5 is passed along the splitter 25 so that the seam 50 of the insulation will be reopened. The splitter 25 also has the additional function in that it will help to prevent the insulation from turning as it is advanced by the rotating mandrel. In addition the splitter 25 can be constructed so that it is in contact with the stationary mandrel 23 so that it acts as a support for this portion of the stationary mandrel.

Figure 8:
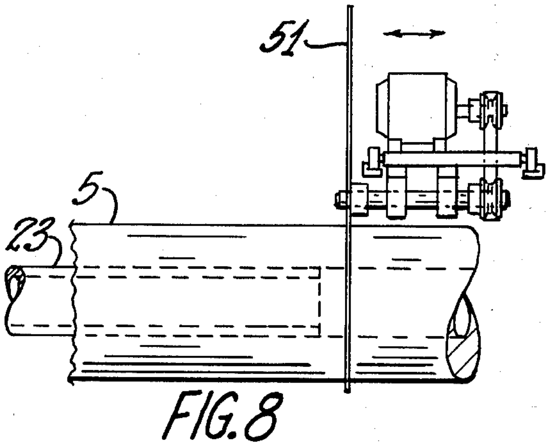
FIG. 8 is a side view showing a cutter that can be used to cut the molded fibrous material to length.
Figure 9:
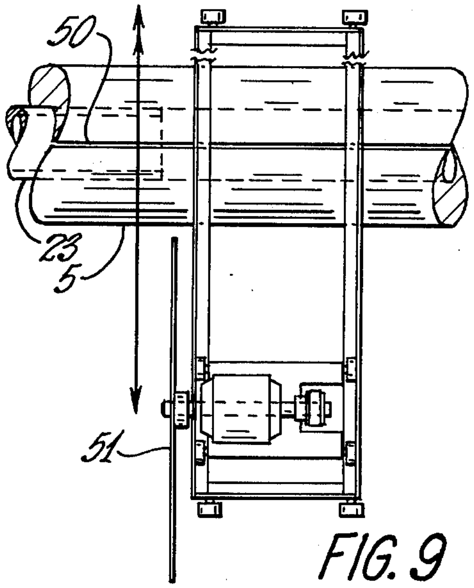
FIG. 9 is a top view of the cutter that can be used to cut the molded fibrous material to length.
Figure 10:
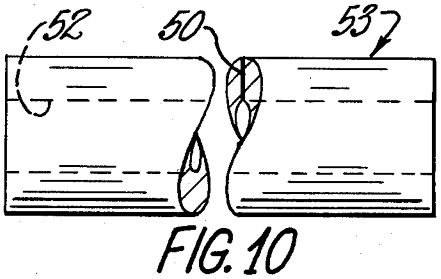
FIG. 10 is a side view of the molded fibrous material.
Figure 11:
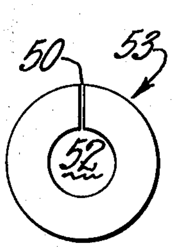
FIG. 11 is an end view of the molded fibrous material.
Figure 12:
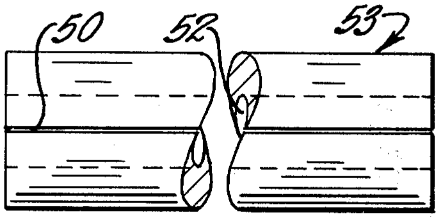
FIG. 12 is a top view of the molded fibrous material.

FIGS. 8 and 9 show the insulation 5 as it leaves the stationary mandrel 23. As the insulation leaves the mandrel 23 it can be cut by means of a suitable cutter 51 or given any other processing that is required. FIGS. 10, 11 and 12 show the cylindrical insulation product 5 that can be produced by this equipment. As shown in these figures the cylindrical insulation has a seam 50 and a hollow cylindrical area 52 in the center. As can clearly be seen this type of insulation product 53 can be very suitable for use on pipe or other long cylindrical objects.

Although the process has been shown forming cylindrical pieces of insulation it should be noted that other shapes could be made. A rectangular, square or other type of cross section could be produced by modifying the forming shoe and forming dies to produce these types of cross sections. Thus, a number of shapes could be produced by this equipment. Also by increasing the density and binder content of the fibrous insulation a structural product could be made instead of an insulation product.

Figure 13:
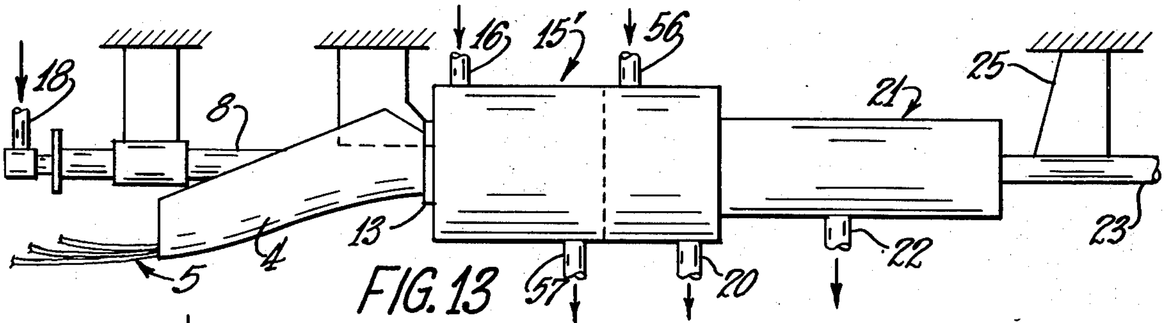
FIG. 13 is a side view of another apparatus that can be used to continuously mold articles from a fibrous material.
Figure 14:
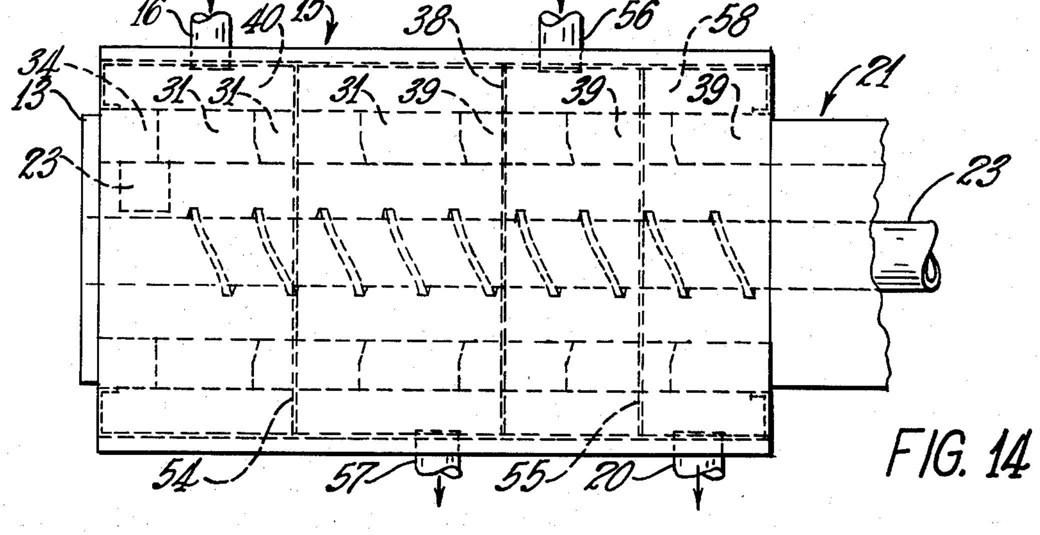
FIG. 14 is a side view of the heated chamber shown in FIG. 13.

FIGS. 13 and 14 show an additional modification that can be made to the heated chamber where the binder on the insulation material 5 is cured. The heated chamber 15' shown in these figures has an additional hot air inlet 56 and hot air outlet 57. Hot air is introduced under pressure through the passageway 16 and the hot air enters the plenum chamber 40 where it passes through the slots and spaces in and between the dies 31 to the insulation material as previously described. In addition, hot air is supplied through the mandrel, and the hot air exits through holes in the mandrel and comes into contact with the insulation. The hot air from the plenum chamber 40 and the mandrel penetrates into the insulation material and cures the binder material on the insulation. After the hot air has acted to cure the binder it is exhausted through the passageway 57 so that additional hot air can be supplied through the passageway 16 and through the mandrel. A partition 38 located at the end of the plenum chamber 40 keeps the hot air supplied through the passageway 16 in the plenum chamber 40. There is a partition 54 located in this section of the heated chamber 15' that separates the hot air inlet 16 from the hot air outlet 57. The hot air supplied through passageway 16 then must penetrate into the insulation and be carried past the partition 54 so that it can be exhausted through passageway 57. If the hot air does not penetrate into the insulation the partition 54 will block the flow of the hot air and prevent the hot air from entering that portion of the plenum chamber 40 where it can be exhausted through passageway 57. Because the hot air penetrates into the insulation a better cure is produced. The hot air inlet 16 and the hot air outlet 57 are positioned on the chamber 15' so that the hot air will move in a direction that is the same as the direction of travel of the insulation.

The second portion of heated chamber 15' has an additional plenum chamber 58. Hot air is supplied through the passageway 56 into the plenum chamber 58 where it moves through holes and slots in the dies 39 to the insulation. In addition, hot air from the mandrel passes through holes to the insulation and the hot air from the mandrel and the dies helps to cure the binder on the insulation. Again partition 38 acts to divide the plenum chamber 40 from the plenum chamber 58 so that the desired air flow is achieved in the chambers. After the hot air supplied through the passageway 56 and through the holes in the mandrel has acted on the binder on the insulation the hot air is exhausted through the passageway 20. There is a partition 55 located in this section of the heated chamber 15' that separates the hot air inlet 56 from the hot air outlet 20. The hot air supplied through the passageway 56 then must penetrate into the insulation and be carried past the partition 55 so that it can be exhausted through the passageway 20. If the hot air does not penetrate into the insulation the partition 55 will prevent it from entering that portion of the plenum chamber 58 where it can be exhausted through the passageway 20. Because the hot air penetrates into the insulation the binder material in the interior region of the insulation is more effectively cured. The inlet passageway 56 and the outlet passageway 20 are in staggered relationship so that the flow of air that comes into contact with the insulation will have a direction that is the same as the direction of travel of the insulation. This type of air flow will help to advance the insulation as it moves through the chamber and keep the hot air in contact with the insulation as long as possible so it will have the maximum effect in curing the binder on the insulation.

It should be noted that almost any combination of hot air supply passageways and hot air exhaust passageways could be used on the heated chamber 15'. It would also be very easy to supply the different hot air inlet passageways with air of different temperatures. Thus a very well controlled thermal gradient could be established along the heated chamber 15' to produce a particular cure or cure rate in the insulation. This variation of thermal conditions would allow the density and skin thickness of the final insulation product to be controlled so that a wide range of products could be produced.

Figure 15:
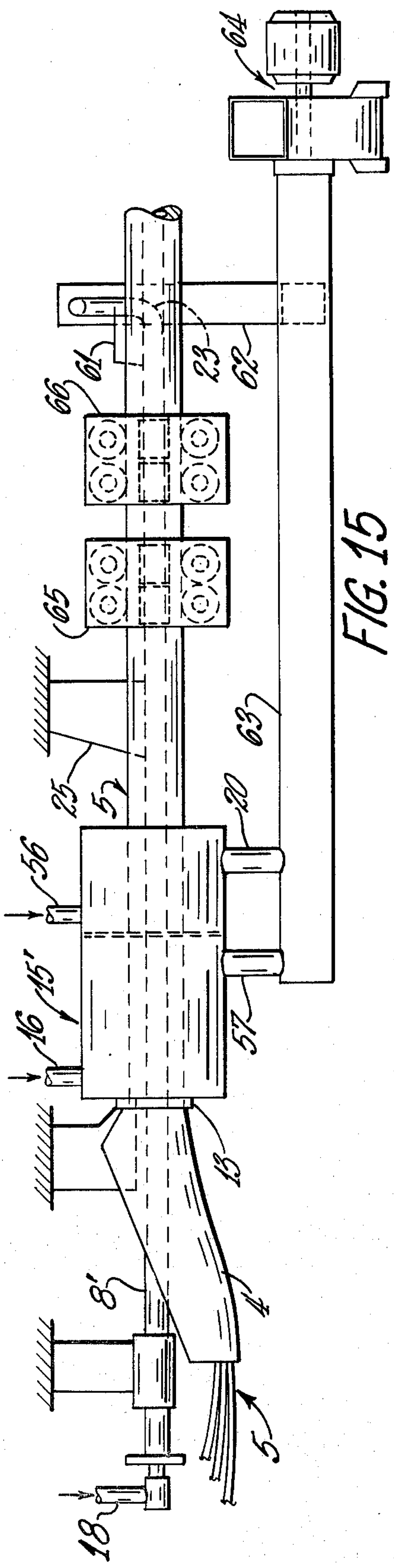
FIG. 15 is a side view of another apparatus that can be used to continuously mold articles from a fibrous material.
Figure 16:
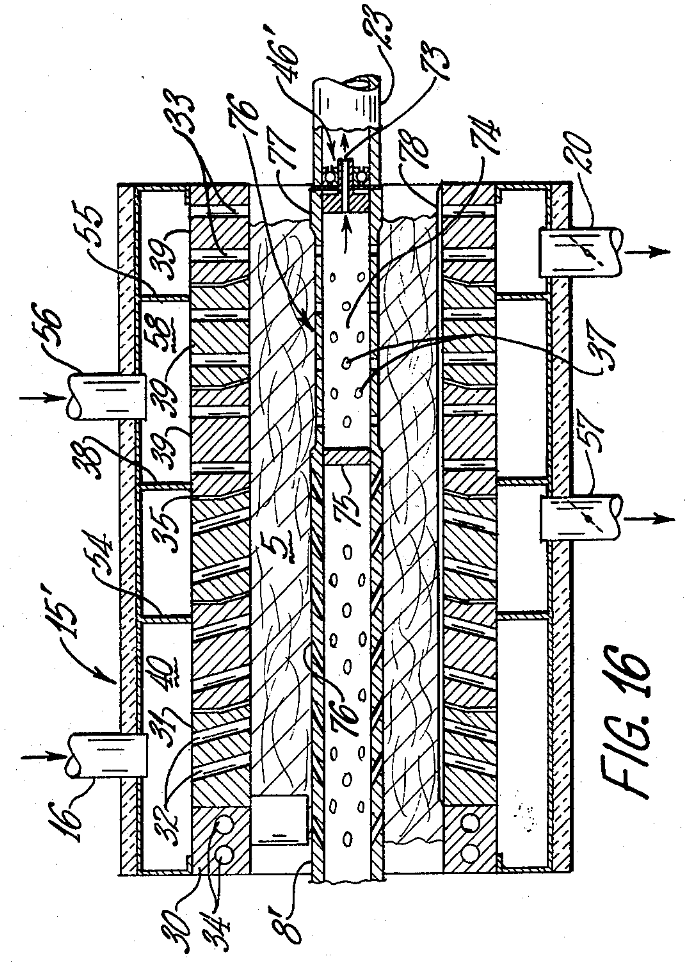
FIG. 16 is a cross sectional view of the heated chamber shown in FIG. 15.

FIGS. 15 and 16 show another embodiment that can be used to continuously mold insulation. In this embodiment insulation material 5 is fed into a forming shoe 4 where it is converted into a cylindrical shape. Then the cylindrically shaped insulation, which is supported on mandrel 8', moves into a heated chamber 15'. It should be noted that the mandrel 8' is a rotating mandrel but that it does not have a helix for advancing the insulation. Instead pullers (65 and 66) at the end of the process are used. However, a mandrel with a helix could be used if desired. The binder material on the insulation is cured in the heated chamber 15' much as described in the previous embodiments. Hot air is supplied through the passageway 16 into the plenum chamber 40 where it passes through the passageways or holes 32 in the dies 31 and spaces 35 between the dies 31 and into contact with the insulation material 5. Also, hot air is supplied through the mandrel 8' and passes through the passageways or holes 37 to come into contact with the insulation 5. The hot air supplied to the passageway 16 and through the mandrel 8' acts to cure the binder on the insulation. However, a plug 75 is located in the mandrel 8' so that the hot air supplied to the mandrel will only travel so far along the length of the mandrel. The plug is located in or near the plane where the partition 38 is located. Thus, the first portion of the heated chamber 15', as defined by the plenum chamber 40, receives hot air from the mandrel 8' to help in curing the binder on the insulation 5. In the second portion of the heated chamber 15', as defined by the plenum chamber 58, hot air that enters through the passageway 56 is used to cure the binder on the insulation 5. The hot air in the second portion of the heated chamber, after it has penetrated the insulation and cured the binder, is exhausted through the outlet passageway 20. In this portion of the heated chamber there is no hot air supplied to the insulation through the mandrel 8'.

In the second portion of the heated chamber 15' there is a smaller section 76 of the mandrel. As the skin cured insulation moves onto the smaller section 76 of the mandrel 8' it moves away from the surfaces of the dies 31 and the dies 39. Since the insulation 5 has been skin cured and high velocity air is being emitted from holes 32 and holes 33 the insulation does not expand out to fill the space created when the insulation moves onto the smaller section of the mandrel. Thus, a gap or space exists between the insulation 5 and the dies and this greatly reduces the friction or drag on the insulation as the insulation is no longer tightly compressed against the dies.

As the mandrel leaves the downstream end of the heated chamber 15' there has a section 77 of mandrel that is the same diameter as that of the portion of the mandrel 8' within the chamber 40. There is a bearing 46' that connects the section 77 of the rotating mandrel 8' with the stationary mandrel 23. The bearing 46' has a passageway 73 through it so that the internal region 74 of the mandrel 8' is connected to the internal region of the stationary mandrel 23. The plug 75 separates the portion of the mandrel in the second portion of the heated chamber from the upstream portion of the mandrel that is supplied with hot air. The end of the mandrel 23 is connected to the passageway 62 which connects to the passageway 63 which connects to an exhaust fan 64. The exhaust fan 64 is used to establish a negative pressure in the interior chamber of the stationary mandrel 23 and in the interior chamber 74 of the section 76 of the mandrel 8'. When the exhaust fan is operating there is a negative pressure established in the interior region 74 of the mandrel 8' and this negative pressure draws hot air into the interior chamber 74 through holes 37. This hot air then passes through the interior region of the stationary mandrel 23 through the passageway 62 and through the passageway 63 and is exhausted out through the exhaust fan 64. Thus, the interior chamber 74 can be used to remove hot air from the insulation 5 instead of supplying hot air to the insulation as is done by the first section of mandrel 8'. Exhaust passageways 57 and 20 can also be connected to the passageway 63 which connects to the exhaust fan 64. Thus, the exhaust fan 64 can also be used to create a negative pressure in these exhaust passageways and to remove hot air that has been used to cure the binder on the insulation 5.

It should be noted that the exhaust passageway 57 and the exhaust passageway 20 do not have to be used to remove hot air that has been used to cure the insulation. Instead, either or both of these exhaust passageways can be closed so that hot air is not removed through these passageways. Instead, the negative pressure created in the interior chamber 74 of the mandrel can be used to pull the hot air through the insulation and into the interior region 74 of the mandrel where it is exhausted. When the interior chamber 74 of the mandrel is used to remove hot air from the insulation it forces the hot air supplied through the passageway 16 and the passageway 56 to pass through the insulation so it can be drawn into the interior of the mandrel. Drawing the hot air through the insulation will help to establish a full and complete cure of the binder that is on the insulation. Thus, it may be very desirable to close the exhaust passageway 57 and the exhaust passageway 20 when a fully cured piece of insulation is desired.

However, the exhaust passageway 57 is usually left open when curing the insulation. This is because in the first curing zone of the heated chamber 15' a skin cure is being produced on the insulation. To produce this skin cure the insulation should be subjected to a high temperature to cure the binder on the exterior and interior surface of the insulation. Therefore, the exhaust passageway 57 is used to remove the hot air so it is not in contact with the insulation for too long a period of time. If this exhaust passageway is closed the hot air in this chamber will stay in contact with the insulation and provide a depth cure. If, in some cases, a very compelte depth cure is required on the insulation product, hot air could be supplied to the insulation through either or both of the passageways 57 and 20 to further cure the insulation. However, if a skin cure is desired hot air would not normally be supplied through the passageway 57.

The section 77 of the mandrel is used to house bearing 46' and also to expand the insulation so that insulation fills the space between the mandrel and the dies of the heated chamber. When the insulation 5 passes onto the expanded section 77 of the mandrel the insulation is compressed against dies 39 and against the expanded section 77 of the mandrel and the tighly compressed insulation forms a seal. This seal is very important because it keeps the air from the atmosphere from being drawn into the heated chamber 15' and into the holes 37 by the negative pressure in the interior regions of the mandrel. Also if exhaust passageway 20 is connected to the source of negative pressure the passageway 20 also could draw in air from the atmosphere without the seal provided by the section 77 of the mandrel. Thus it is important to have the expanded section 77 of the mandrel to house bearing 46 and to align the insulation with the stationary mandrel 23, but it is also important to have the expanded section 77 of the mandrel so it forms a seal or air barrier at the end of the heated chamber.

Along the lower interior surface of the heated dies there is a ridge 78 that engages the insulation as the insulation advances. The ridge 78 is used to help prevent the insulation 5 from rotating as the mandrel rotates. To be effective in helping to eliminate rotation the ridge must press up into the insulation and form an indentation so that the ridge is firmly in contact with the insulation. Usually the ridge runs along the entire length of the dies but this is not necessary. Also any number of ridges could be used to help prevent rotation and the ridges could be placed anywhere along the length of the dies.

Figure 17:
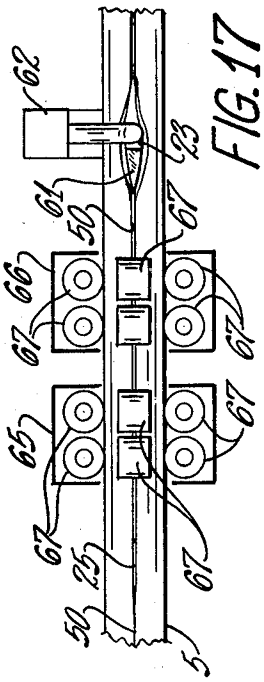
FIG. 17 is a top view of the pulling rolls and spreader shown in FIG. 15.

After the insulation 5 leaves the heated chamber 15' the seam on top of the insulation is reopened by a splitter 25. Next the insulation 5 is passed through a puller 65 and a puller 66 which will advance the insulation. As shown in FIG. 17, each of the pullers 65 and 66 has a series of wheels 67 which are rotated by means of a motor. As the wheels 67 are in contact with the insulation 5, when the wheels are rotated in the same direction as the direction of travel of the insulation it helps to advance the insulation. The force supplied by the puller 65 and the puller 66 helps in moving the insulation through the forming shoe 4 and in moving the insulation through the dies of the heated chamber 15'. This is especially important when the equipment is first being started as it takes a large amount of force to initially form and move the insulation through the dies of the heated chamber 15'.

If the mandrel 8' were provided with a helix for advancing the insulation it would be necessary for the pullers to advance the insulation at the same speed that it was being advanced by the rotating mandrel. If the advancing speed of the pullers varied much from the advancing speed of the rotating mandrel, stress would be applied to the insulation and this can mis-shape or break the insulation. Therefore, it would be necessary to balance the speeds used to advance the insulation so they would be approximately the same. Although two pullers using driven wheels as a pulling mechanism are shown, it should be recognized that almost any number of pullers could be used and almost any suitable pulling means could be used to help advance the insulation.

After the insulation 5 passes through the puller 65 and the puller 66 it comes into contact with a spreader 61 which spreads open the seam on the top of the insulation. As shown in FIG. 17 it is necessary to spread the seam of the insulation 5 so that the insulation will fit around the end of the stationary mandrel 23 which is now connected to the exhaust passageway 62. The connection between the stationary mandrel 23 and the exhaust passageway 62 is directed upward from the mandrel and then sideways to the exhaust passageway. Therefore, when the seam 50 on top of the insulation 5 is reopened and spread apart by the angled blades of the spreader 61 the spread-apart seam allows the insulation to pass around the upward section of the connection between the mandrel and the exhaust passageway. This allows the insulation 5 to be advanced off the end of the mandrel. After passing the end of mandrel 23 the insulation can be cut to length or additional processing of the insulation can then take place.

Figure 18:
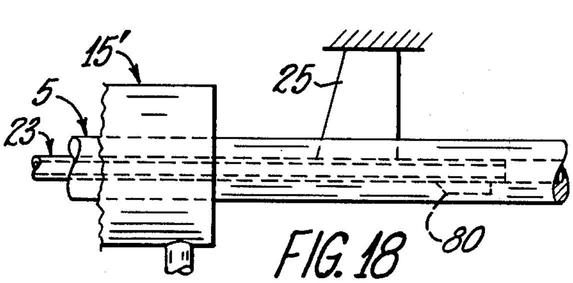
FIG. 18 is a side view that shows the angled blade that is used to put a slot in the bottom interior surface of the molded fibrous material.
Figure 19:
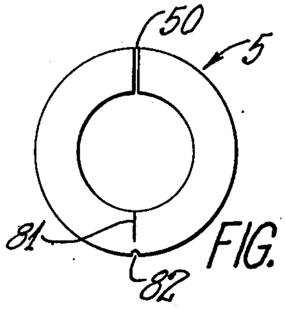
FIG. 19 is an end view of the molded fibrous material with a slot in the bottom interior surface.
Figure 20:
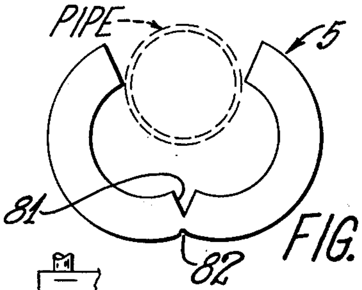
FIG. 20 is an end view of the molded fibrous material shown in FIG. 19 where the fibrous material has been spread apart with the slot in the bottom interior surface of the molded insulation acting as a hinge point.

FIG. 18 shows an additional feature that can be added to this continuous insulation forming process. In this figure an angled blade 80 is attached to the bottom of the stationary mandrel 23. The blade 80 is used to put a slot or cut groove 81 in the bottom interior surface of the insulation. As is shown in FIGS. 19 and 20 the cut groove 81 acts as a hinge for the insulation 5. Thus, when the seam 50 in the insulation is spread apart the bottom section of the insulation will hinge along cut groove 81 and allow the seam to open further and more easily. This allows the insulation 5 to spread apart along its seam 50 so that it can be removed from the mandrel 23 and so that it can be positioned around the member that is to be insulated. The use of the cut groove 81 also controls or locates the point at which the hinge or fold point will be in the bottom of the insulation. Also, the indentation 82 formed in the bottom of the insulation by the ridge 78 can be located so that it is immediately below the cut groove 81. This position for the indentation 82 will allow it to act as a fold or hinge point in combination with the cut groove when the insulation is spread apart along its seam 50. Therefore, the indentation can have a functional purpose in the finished product as well as being used to help eliminate rotation of the insulation.

Figure 21:
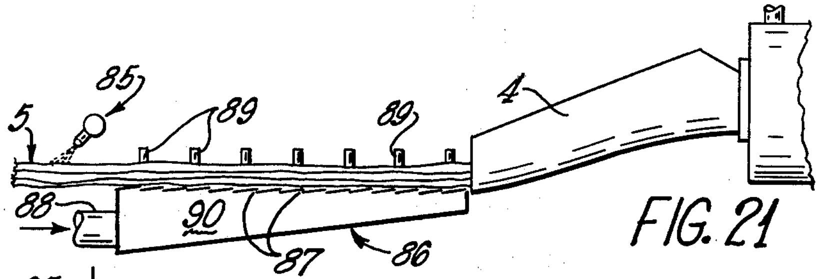
FIG. 21 is a side view of an air conveyor that can be used to supply the fibrous material to the forming member.
Figure 22:
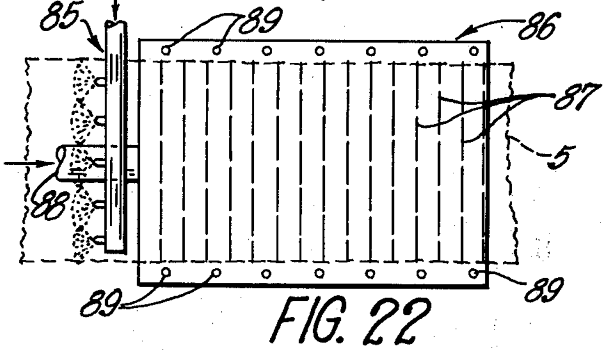
FIG. 22 is a top view of the air conveyor that can be used to supply the fibrous material to the forming member.

FIGS. 21 and 22 show an additional way for supplying or moving the insulation 5 into the forming shoe 4. Supplying the insulation 5 to the forming shoe 4 in these figures is accomplished by means of an air conveyor 86. Air is supplied to the air conveyor through an air passageway 88 and the air leaves the chamber 90, in the conveyor, through louvers 87 that are located in the upper surface of the air conveyor. The insulation 5 rides on the layer of air that escapes through the louvers 87 and the louvers are angled so that the escaping air acts to move the insulation 5 towards the forming shoe 4. To keep the insulation properly centered on the air conveyor, guide pins 89 are positioned along the upper edges of the conveyor and act to keep the insulation positioned over the louvers 87. Since the insulation 5 is riding on a layer of air, there is very little friction and the insulation moves very easily; therefore, it is very easy for the guide pins 89 to keep the insulation properly positioned. The lack of friction in the insulation supply system helps to reduce the amount of force that is later needed to move the insulation through the additional processing steps.

Also shown in FIGS. 21 and 22 is a series of spray devices 85 that are used to spray a release agent and lubricant on the insulation. The release agent and lubricant help to reduce the frictional drag on the insulation as the insulation later passes through the forming shoe and the dies. In practice it has been found that a material containing silicone works very well as a release agent and lubricant for the insulation.

Figure 24:
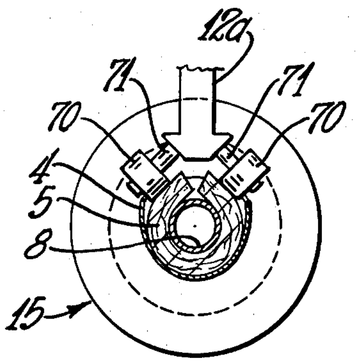
FIG. 24 is an end view of the wheels shown in FIG. 23.
Figure 23:
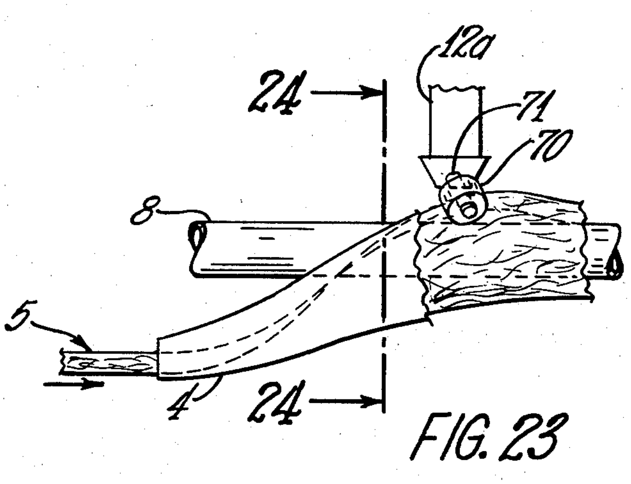
FIG. 23 is a side view of the wheels that can be used to help advance the fibrous material in the forming member.

FIGS. 23 and 24 show an additional improvement that can be used to help feed the insulation 5 into the heated chamber 15. The improvement consists of a pair wheels 70 supported on shafts 71, and the shafts 71 are connected to a suitable motor that will rotate the wheels 70. Thus, when the wheels 70 are rotating in the direction that the insulation advances they will help to feed the insulation material 5 into the heated chamber 15. The rotating wheels 70 also have the additional advantage in that they hold the insulation against the forming shoe 4 so that the insulation is properly formed into a cylindrical shape. In addition, the wheels also precompress and form pleats in the insulation 5 so that it will more easily pass into the passageway in the heated chamber 15.

Figure 25:
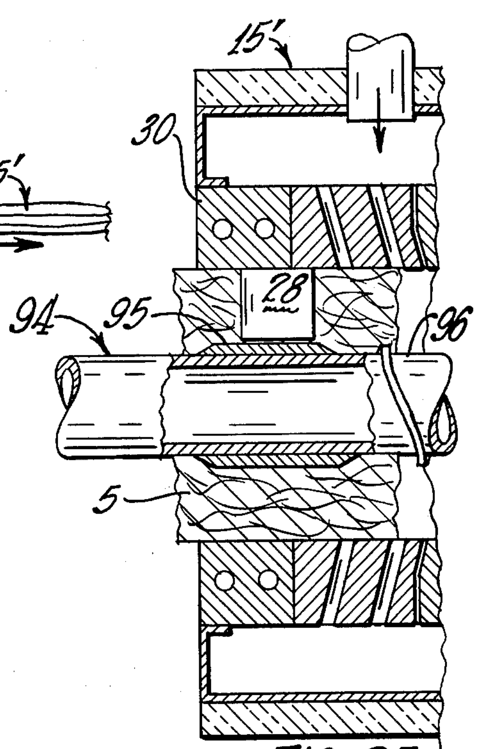
FIG. 25 is a partial cross sectional view of the heated chamber showing an expanded section of mandrel located in the same area as the heated die.
Figure 26:
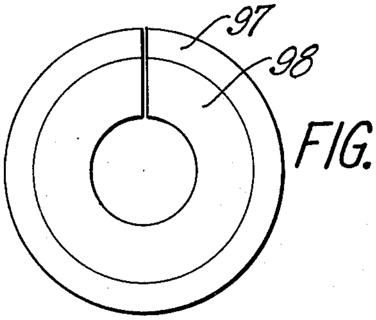
FIG. 26 is an end view of the molded fibrous material that can be produced by using the apparatus shown in FIG. 25.

In FIG. 25 a different mandrel configuration is shown. The mandrel shown in this figure has a section 94 and another section 96 that are of the same diameter. However, there is an expanded portion 95 that is located between the section 94 and the section 96 of the mandrel. The expanded mandrel portion 95 is located just inside the heated chamber 15 and directly beneath the heated die 30. Thus, as the insulation enters the heated chamber 15 it moves onto the expanded portion 95 and is further compressed between this section of the mandrel and the heated die 30. While in this compressed condition, the exterior surface of the insulation is skin cured by the heated die 30. Since the insulation has been compressed this exterior portion of the insulation will cure at the density present in the compressed insulation. The skin cured insulation will then move off the expanded mandrel portion 95 and onto the smaller section 96 of the mandrel. The remaining uncured portion of the insulation will be cured as it moves along the smaller section 96 of the mandrel and since the insulation will not be compressed as much on this portion of the mandrel the insulation in this region will cure at a lower density. FIG. 26 shows the product that can be produced by using the mandrel shown in FIG. 25. As shown in this figure the insulation produced has an exterior region 97 of insulation that has been cured at a higher density and an interior region 98 of insulation that has been cured at a lower density. There would probably not be a definite dividing line between the higher density insulation and the lower density insulation; instead there would be a transition zone of insulation of varying density between the two sections. This type of product would be very useful where a high density exterior surface was required on a section of insulation with insulation of a lower density in the core region of the product. This type of product would have a tough exterior surface that could withstand abuse with a core that has good insulating properties. The advantage of making this type of product on a mandrel with an expanded section would be that only one type or density of insulation would have to be supplied to the heated chamber and a dual density product would be produced.

Figure 28:
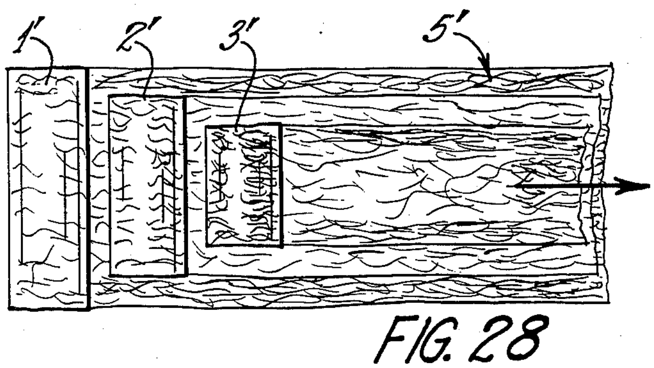
FIG. 28 is a top view of the supply system shown in FIG. 27 and showing the varying widths of the rolls of fibrous material.
Figure 29:
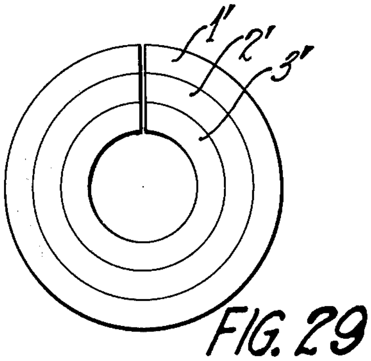
FIG. 29 is an end view of the fibrous material supplied by FIG. 28 when the fibrous material has been formed into a cylindrical shape.
Figure 27:
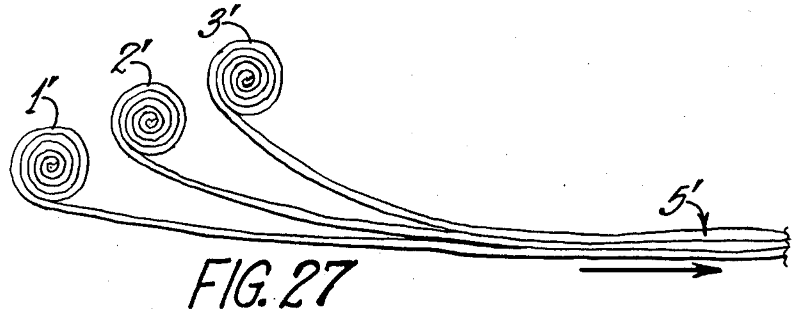
FIG. 27 is a side view of a supply system for supplying fibrous material.

FIGS. 27 and 28 show a different way to feed insulation into the forming shoe. Roll of insulation 1', roll of insulation 2', and roll of insulation 3' are combined to form a blanket of insulation 5'. However, the width of the rolls of insulation varies, with roll of insulation 1' being the widest, than roll of insulation 2' being a little bit narrower and roll of insulation 3' being the narrowest. This blanket of varying width insulation 5' can be constructed so that when the insulation is formed into a cylindrical shape (FIG. 29) the various layers will have approximately the same width as the corresponding circumference of these layers once they are formed into a cylindrical shape by the forming shoe. This allows the insulation to be more easily formed and the shape of the insulation will be more cylindrical. The main advantage of this type of insulation supply is, however, that it forms a very straight seam 50' along the top of the insulation. Thus, when the seam in the insulation 5 is skin cured a very straight and neat seam will be formed. If the end use of the insulation requires a very straight, tight fitting seam, this type of process can be used to produce the seam.

The three layers of varying width insulation supplied can also vary in fiber diameter and binder content. The varying fiber diameter will allow an insulation product to be formed that has varying thermal properties along the cross section of the wall of the insulation. Usually the fiber diameter would be varied so that the larger diameter fibers would be on the exterior and the smaller diameter fibers on the interior of the finished product. Also, the binder content on the rolls of insulation could be varied. Usually the binder content would be arranged so that the highest binder content would be found on the exterior layer of insulation and the lowest binder content of the interior layer of insulation. When this type of product is cured a very thick hard skin would be formed in the higher binder content insulation that is located on the exterior of the insulation product. The hardness of the insulation would then vary through the rest of the product with the softest portion being the insulation with low binder content found on the interior of the product. This would form a product with a tough, hard and abuse resistent outer skin and a softer core of insulation with good insulating qualities.

As another variation, the insulation in the interior region of the product can be insulation that does not contain any binder material. Thus, when the insulation is cured this section of insulation would not have any binder to be cured and as a result the insulation would remain uncured and would have very good thermal insulating properties. The insulation without binder would be held in position by the cured insulation that surrounds it and the cured insulaton would hold the entire section of insulation in a cylindrical shape. This type of product would have the additional advantage that there would be no binder in the interior region of the insulation that could build up on the mandrel or causing sticking problems on the mandrel.

This method of supplying three widths of insulation is very useful when a very uniform, tight sealing seam is required or when a product with varying binder content is required. However, the various types of insulation used create an inventory and supply situation that is more complex than when only one type of insulation is used. Therefore, this method is only used when the desired characteristics of the finished product require this complex system. Of course the use of three different types of insulation is only an example and any number of rolls of insulation of varying width and varying binder content could be used.

Figure 32:
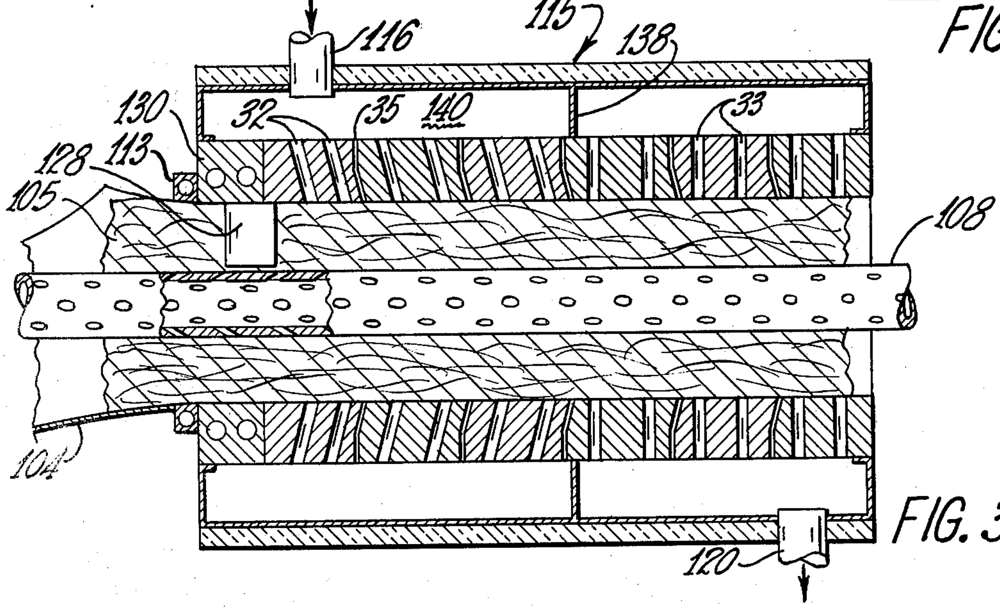
FIG. 32 is a cross sectional view of the heated chamber shown in FIG. 30.
Figures 30, 31, 33, 34, 35:
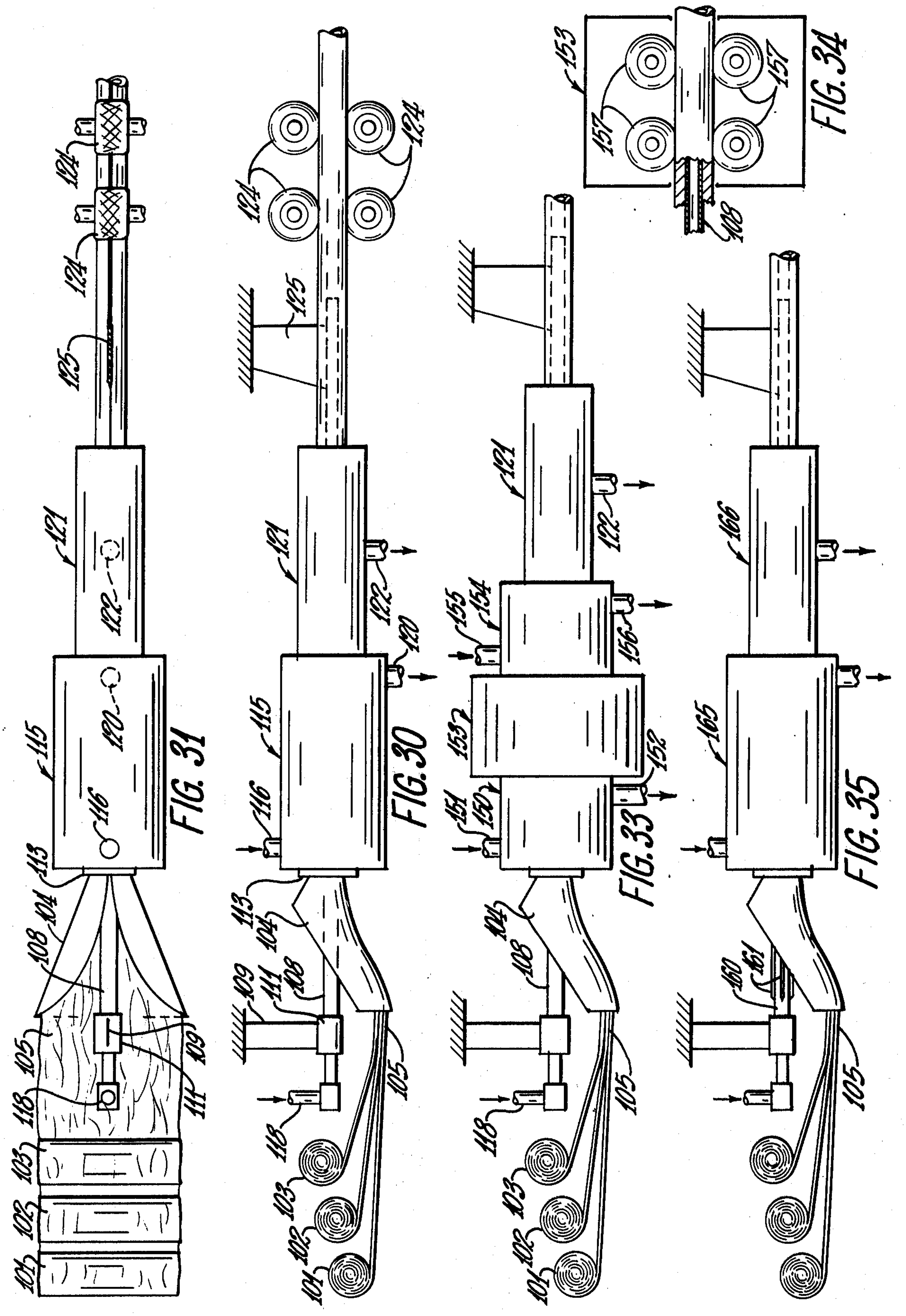
FIG. 30 is a side view of another apparatus that can be used to continuously mold articles from a fibrous material.
FIG. 31 is a top view of the apparatus shown in FIG. 30.
FIG. 33 is a side view of another apparatus that can be used to continuously mold articles from a fibrous material.
FIG. 34 is a side view of the pulling wheels, shown in FIG. 33, that are used to advance the fibrous material.
FIG. 35 is a side view of another apparatus that can be used to continuously mold articles from a fibrous material.

FIGS. 30, 31 and 32 show an alternative system for making continuous molded insulation. In this system insulation from roll 101, roll 102 and roll 103 is fed into a forming shoe 104 where the insulation is converted into a cylindrical shape. As the insulation is formed into a cylindrical shape it also forms around a mandrel 108 that is positioned so that it fits into the hollow exterior core of the cylindrical insulation. As the insulation 105 advances through the forming shoe 104 it passes through a cooling coil 113 and into a heated chamber 115 where the binder on the insulation is cured. Hot air is supplied to the passageway 118 into the interior of the mandrel 108 and through the passageway 116 into the interior of heated chamber 115, much as shown before in earlier embodiments, and this hot air is used to cure the binder on the insulation. As can be seen in FIG. 32 the system for curing the insulation is the same as shown before, only in this system the mandrel 108 is not rotating. Next the insulation moves into a cooling chamber 121 where the remaining heat in the insulation is removed, so that the binder will be fully cured. Then the insulation is advanced to pulling wheels or rolls 124 that supply the force to advance the insulation. After passing through the pulling rolls 124 the insulation advances off the end of the mandrel and the insulation can be cut to length or further processed.

Since the mandrel 108 is not rotating or moving it cannot act to advance the insulation. Therefore a different system must be used to advance the insulation through the forming and curing sections in this process. To supply the force to advance the insulation pull wheels or rolls 124 must be used. The pulling rolls 124 frictionally engage the insulation and cause it to advance when the pulling rolls 124 are rotated. Of course, a suitable motor or drive means must be used to rotate the pulling rolls 124 so that the insulation will be advanced at the proper speed. The pulling rolls 124 will supply most of the force needed to advance the insulation. However, the movement of the hot air in the heated chamber 115 also supplies some force to advance the insulation. In addition, the negative pressure established in exhaust passageway 120 not only provides the proper flow direction for the exhausted hot air but it also creates a suction force on the insulation and this helps to advance the insulation through the heated chamber. Although four pulling rolls have been shown it should be understood that almost any number of pulling rolls could be used. It should also be recognized that pulling rolls are used only as an example, and that a number of suitable advancing means could be used to advance the insulation.

The stationary mandrel 108 of this alternative system is easy to maintain and is easy to keep in proper alignment since it is stationary. Once the mandrel 108 is properly positioned it should maintain this position without the need of further alignment. And there would be very little maintenance on the mandrel as there are no moving parts that could wear or need maintenance. Also one continuous mandrel can pass through the heated chamber 115, the cooling chamber 121 and the pulling rolls 124 when a stationary mandrel is used. This eliminates the bearings and transition zone that can create problems when a combination of rotating and stationary mandrels is used. The continuous mandrel would probably be more sturdy and less likely to bend or break than a two-piece rotating and stationary mandrel. However, the mandrel 108 cannot supply any force to the insulation to advance it through the forming and curing zones. Therefore, the pulling rolls 124 must supply most of the force to advance the insulation. Since the pulling rolls 124 are located at the end of the process they must pull the insulation through the forming and curing zones. This puts a substantial stress on the insulation and can result in deforming or breaking of the insulation by force generated by the pulling rolls to advance the insulation. To protect against this type of damage it may be necessary to put some type of reinforcement on the insulation to carry the load created by pulling rolls 124 as they advance the insulation. A non-woven reinforcing fabric made from glass fibers can be used to reinforce the insulation so it does not deform or break when it is advanced by the pulling rolls 124. Usually the non-woven fabric is applied to the exterior surface of the insulation and the non-woven fabric reinforces the insulation so that the insulation is not effected by the tension generated on the insulation by the pulling rolls 124 as they advance the insulation. In practice it has been found that a reinforcing fabric usually does not have to be used on the insulation.

In FIGS. 33 and 34 an additional system for making the continuous insulation is shown. This system uses a stationary mandrel 108, as previously shown, and an insulation advancing means 153 that is located in the chamber where the insulation is cured. By locating the advancing means 153 in this position it divides the curing region of the apparatus into two sections. Thus, there is section 150 located ahead of the pulling means and section 154 located after the pulling means and the insulation is cured in both of these sections. Each of the curing sections has its own hot air inlet and hot air outlet and would act in the same way as the previously described heated chambers to cure the insulation. The advancing means 153 could use a series of pulling rolls 157 as previously shown or any other suitable linear advancing means.

The reason for locating the advancing means 153 in the chamber where the insulation is cured is to reduce the tension in the insulation as it is formed. When the advancing means is located downstream of the curing and cooling regions that form the insulation into a cylindrical product the insulation must be pulled through the heated chamber and through the cooling chamber and the resulting drag on the insulation creates a great deal of tension. This tension is frequently high enough that it will stretch the insulation or in some instances even cause the insulation to break as it is pulled through the forming chambers. By locating the pulling means 153 between the heated chamber 150 and the heated chamber 154 the insulation must be pulled only through the forming shoe 104 and the heated chamber 150. By pulling the insulation through only the forming shoe and a portion of the heated chamber a great deal of the tension on the insulation is eliminated. Then the insulation is pushed by the advancing means 153 through heated chamber 154 and through cooling chamber 121. And when the insulation is being pushed it is not put under tension that can cause the insulation to break. Thus, by pulling the insulation through only the forming shoe and a portion of the heated chamber the tension on the insulation is greatly reduced and the amount of stretching and breaking of the insulation is also greatly reduced. With this location for the advancing means 153 the tension on the insulation is reduced enough that even low density insulation can be used without a reinforcing fabric.

Figure 36:
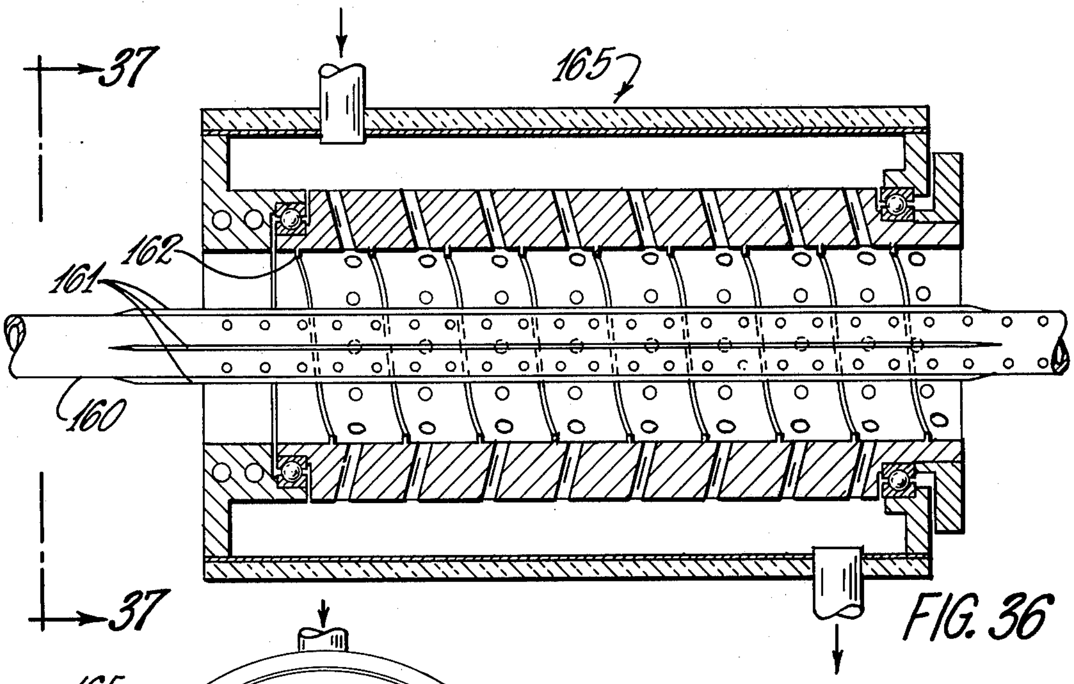
FIG. 36 is a cross sectional view of the heated chamber shown in FIG. 35.
Figure 37:
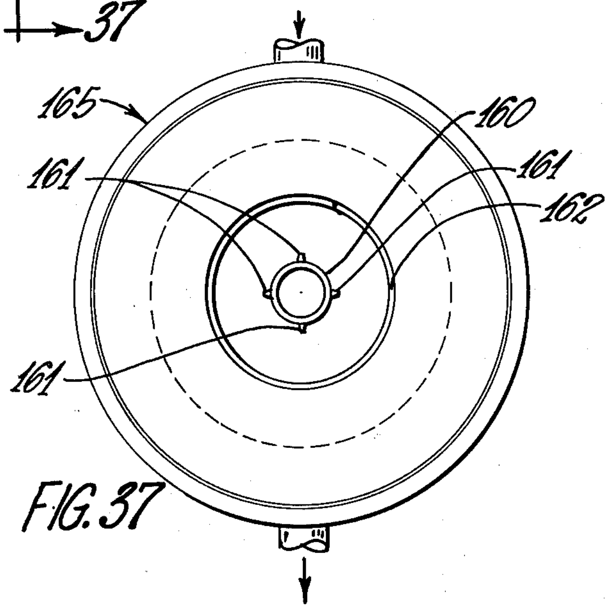
FIG. 37 is an end view of the mandrel and heated chamber shown in FIG. 35.

FIGS. 35, 36 and 37 show an additional way that the insulation can be advanced. In these figures the insulation 105 is formed around a stationary mandrel 160 that has fins or blades 161 projecting from a portion of the mandrel 160. In the heated chamber 165, where the insulation is cured, there is a rotatable helix 162 that is in contact with the outer surface of the insulation. When the helix 162 is rotated, the insulation 105 that is in contact with the helix is advanced along the rotating helix. Of course, a suitable drive arrangement will be connected to the helix 162 to rotate the helix so that the insulation will be advanced at the proper speed. The helix can be a self-contained unit that is rotated to advance the insulation or the helix can be connected to the dies in the heated chamber 165 and the dies and helix will both be rotated to advance the insulation. The fins or blades 161 on the stationary mandrel 160 engage the interior surface of the insulation 105 and keep the insulation from rotating as the helix 162 rotates. Without the fins 161 the insulation would just rotate when the helix rotates and the insulation would not be advanced.

When the insulation produced has a very small interior passageway and the wall of insulation is very thick, this type of helix which engages the exterior surface of the insulation could be used very effectively. With the small interior passageway in the insulation it would be very difficult to design a rotating mandrel or other drive means that engages the interior surface to advance the insulation. Thus, it would be necessary to have some kind of drive means that engages the exterior surface of the insulation and the rotating helix 162 provides such a drive means.

Figure 39:
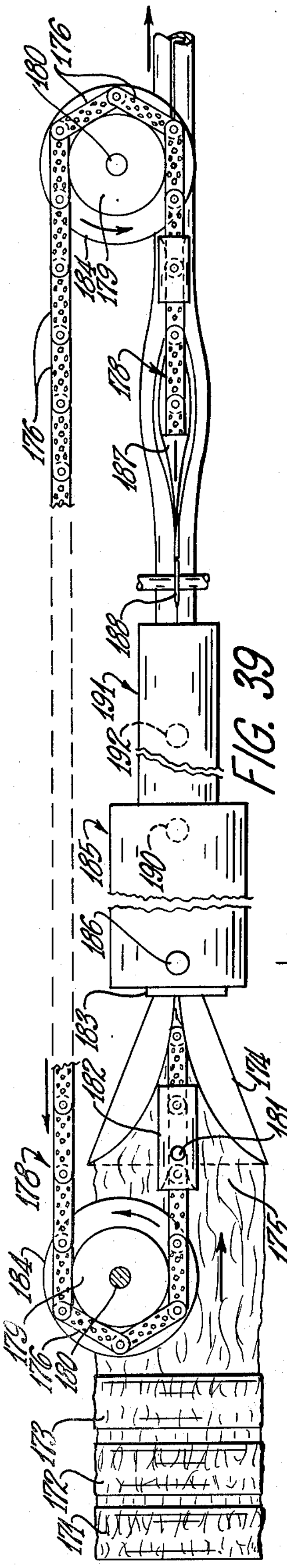
FIG. 39 is a top view of the apparatus for continuously molding articles from a fibrous material shown in FIG. 38.
Figure 38:
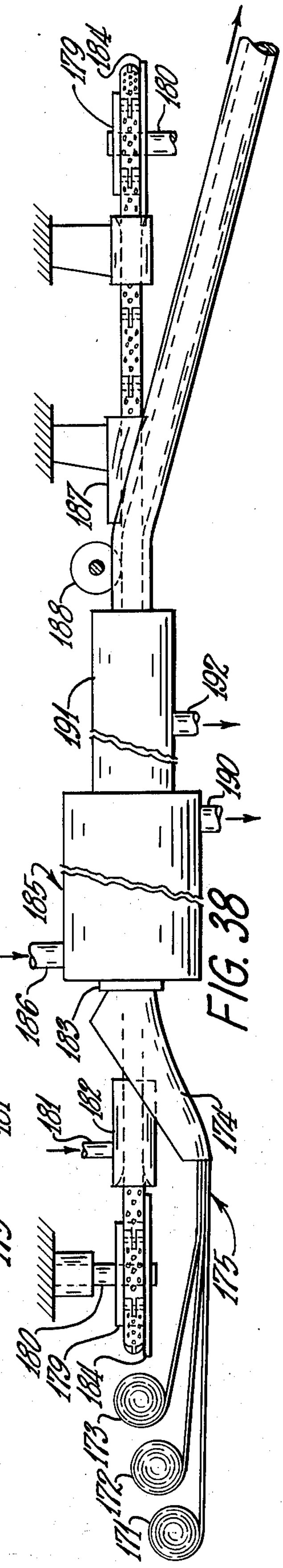
FIG. 38 is a side view of another apparatus that can be used to continuously mold articles from a fibrous material.

FIGS. 38 and 39 show another way that the insulation can be advanced while it is being formed into a cylindrical product. In this system the insulation is formed by a forming shoe 174, cooled by a cooling coil 183, cured in a heated chamber 185 and cooled in a cooling chamber 191 just as shown in the previous examples. However, in this case the insulation 175 is formed around an articulated mandrel or chain 178 and the articulated mandrel supplies the force to advance the insulation 175. The articulated mandrel 178 is located on two drive pulleys 179 that are located at each end of the process. The drive pulleys 179 are supported by a shaft 180 that is connected to a suitable drive motor which is used to rotate the drive pulleys 179. As the drive pulleys 179 are rotated the articulated mandrel 178 is caused to advance in a continuous path around the drive pulleys. When the articulated mandrel 178 is engaged by the drive pulley 179 it is supported on a flange 184 that keeps the mandrel at the proper elevation. As the articulated mandrel 178 is advanced by the rotating drive pulleys 179 the insulation that is in contact with the mandrel is also advanced. As the articulated mandrel 178 extends all the way through the process the insulation is carried along on a moving surface from the time it is formed into a cylindrical shape until the insulation is cured. To help the articulated mandrel grip the insulation, lugs or some other suitable device could be used. The lugs would project from the articulated mandrel and penetrate into the insulation and provide a better grip on the insulation. The addition of lugs or some other suitable device would be especially useful if the insulation was slipping on the mandrel as the mandrel was advanced.

In the previous examples hot air has been injected into the center of the mandrel and this hot air has been allowed to escape in the heated chamber and thereby to help cure the inside region of the insulation. With the moving articulated mandrel 178 it would be very difficult to inject hot air into the center of the mandrel and have it escape in the region of the heated chamber 185. Instead, the mandrel is heated and this heat will help to cure the interior region of the insulation. To heat the mandrel 178 gas or other combustible material is supplied through the passageway 181 to a heater 182 that is used to heat the mandrel. As the mandrel 178 advances it passes through the heater 182 just before the insulation 175 is formed around the mandrel by the forming shoe 174. Thus, the mandrel becomes heated just prior to coming into contact with the insulation and the heat of the mandrel can then be used to help cure the interior region of the insulation 175.

After the insulation product has been formed and cured, a slitter 188 can be used to open the seam on the top of the insulation. It should be noted that the slitter 188 is used to form the seam in the insulation instead of just reopening the seam. It is necessary to form the seam because the insulation has not had a seam molded in during the curing operation. Instead the insulation was formed into a cylindrical body and then cured in this form without a seam. This can be accomplished by removing the heated blade that normally is used to cure the seam in the insulation. After the insulation has been cured into this continuous cylindrical shape the seam is cut into the insulation by the slitter 188. This is an additional method for forming the seam in the insulation. Then the insulation comes into contact with member 187 which spreads the seam on the insulation and also deflects the insulation in a downward direction. It is necessary for the member 187 to deflect the insulation in a downward direction so that the insulation will no longer be on the mandrel 178 when the mandrel comes into contact with the drive pulley 179. Therefore, the member 187 spreads open the seam on the top of the insulation and as the seam opens the insulation is deflected in a downward direction. The combination of opening the seam and directing the insulation downward is necessary so that the seam in the insulation will be spread far enough apart that the cured insulation can move downwardly off the mandrel.

Figure 40:
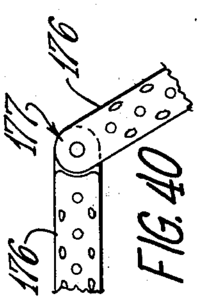
FIG. 40 is a top view showing the details of the joint in the articulated mandrel shown in FIG. 38.

When the mandrel 178 comes into contact with the drive pulley 179 the articulated mandrel must be able to bend or change shape so that the direction of advancement of the mandrel can be changed by the pulley. To accomplish this the articulated mandrel 178 is made up of a series of links 176 that have a pivot joint 177 between each pair of adjacent links of the mandrel (FIG. 40). Thus, when the mandrel 178 comes into contact with the drive pulley 170, the links 176 of the mandrel will pivot around their joints 177 so that they can travel around the drive pulley and the direction of advancement of the mandrel is thereby changed. Having the links in the mandrel allows the mandrel to conform to the drive pulleys so that the drive pulleys can engage and advance the mandrel. The flexibility in the mandrel, created by the links 176, also allows the mandrel to be advanced in a continuous path around the drive pulleys 179. When the mandrel is in the area between the drive pulleys 179 the tension on the mandrel 178 causes the sections of mandrel 176 to align and form a straight mandrel. In addition, the heater 182 can act as a guide tube to help align the sections of the mandrel. And the straight portion of mandrel is necessary to carry the insulation through the straight forming and curing regions.

The size of the insulation product produced by the articulated mandrel is very easily changed. The tension on the mandrel is reduced and the mandrel removed from the flange 184 by lifting the mandrel off the top of drive pulleys 179 and then the mandrel can be removed from the forming and curing regions. Then an articulated mandrel with a larger diameter for larger sizes of insulation, or an articulated mandrel with a smaller diameter, for smaller sizes of insulation, can be deposited in the forming and curing regions, slipped onto the drive pulleys 179 and the tension on the mandrel adjusted to the proper setting to hold the mandrel in place. The articulated mandrel that is placed on the drive pulleys will have to be constructed so that it has the proper pitch to operate correctly on the drive pulleys. When this change has been completed a different size of insulation product can be made.

The configuration of the pivot joints between links of the mandrel could be varied so that the end of one link would have a center portion that extends beyond the normal end of the link. This center portion would be designed to fit into a U-shaped channel on the end of the adjacent connecting link. When the mandrel was straightened the center portion would fit into the U shaped channel to form a straight mandrel. The advantage of this type of joint is that when the center portion is aligned in the U shaped channel there is very little play in the joint and this would help to reduce sag in the mandrel so that a more uniform product could be made. Of course, this type of a variation is especially important if the sag of the mandrel effects the suitability of the finished product.

In addition, the mandrel could be made hollow with a joint configuration that would allow hot air to be circulated in the articulated mandrel. This would help to cure the interior region of the insulation. The hot air could be used either with or without the heater for heating the articulated mandrel. Of course other changes could also be made in the mandrel to achieve other desired results.

Figure 41:
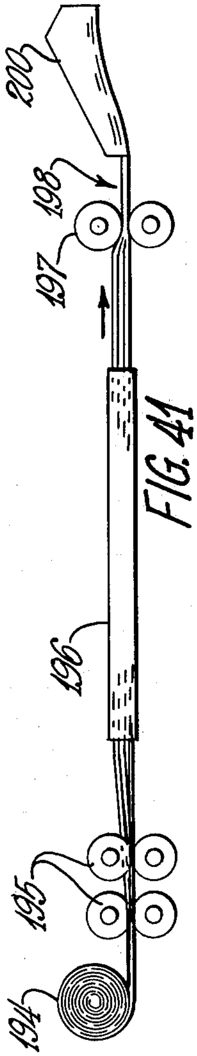
FIG. 41 is a side view showing an alternate system for supplying fibrous material to the forming member.
Figure 42:
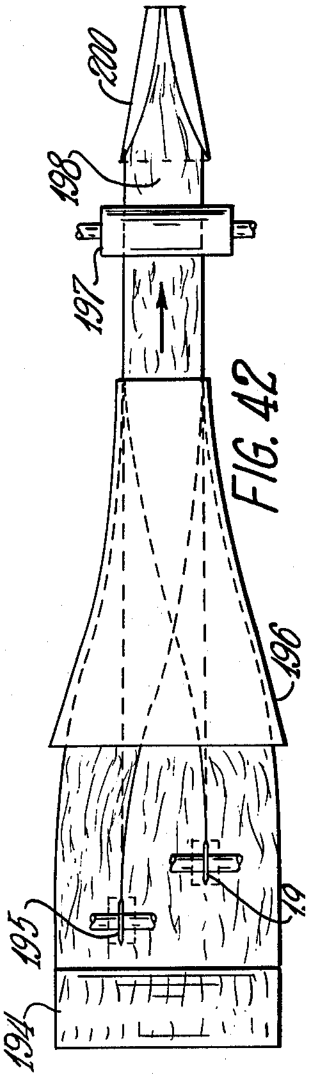
FIG. 42 is a top view of the system for supplying fibrous material shown in FIG. 41.

In FIGS. 41 and 42 a different system is shown for supplying insulation to the forming shoe 200. In this system a single roll of insulation 194 is used and divided into three sections by a splitter 195. The three sections of insulation then move into an arranger 196 that moves and positions the three sections of insulation so that they form a single thick blanket of insulation. The three sections of insulation then move from the arranger 196 into compaction rolls 197 that compact the three sections of insulation into one thick section of insulation 198. The thick section of insulation 198 is then ready to be sent into the forming shoe 200 so that it can be converted into an insulation product. It would also be possible to arrange the splitter 195 so that the three sections of insulation were different widths so that a straighter seam would be formed when the insulation is formed into a cylindrical shape. This type of insulation supply system allows one roll of insulation to be used to make a three layer blanket of insulation. The main advantage of this system is that it reduces inventory and supply problems as only one roll of insulation is used. Therefore, there is no need to stock and supply different kinds or widths of insulation. Also, as only one roll is used the individual strips of insulation will always be used up or finished at the same time.

Having described the invention in detail and with reference to particular materials, it will be understand that this information is given solely for the sake of explanation. Various modifications and substitutes other than those cited may be made without departing from the scope of the invention as defined by the following claims.

We claim:

1. A method of continuously producing fibrous glass pipe insulation comprising:

a. continuously advancing an elongated strip of fibrous glass wool between a forming shoe and a mandrel longitudinally of the strip and axially of the mandrel, the wool having uncured binder on glass fibers thereof;

b. continuously forming the strip into a longitudinally split hollow cylindrical shape by advancing it through the forming shoe to form it around the mandrel;

c. continuously advancing the formed strip through a curing chamber wherein the binder is cured while the strip is confined in the hollow cylindrical shape; and d. continuously cooling the formed strip immediately before it enters the curing chamber to prevent partial curing of the binder in upstream portions of the strip in the forming shoe and thereby prevent build-up of binder on the forming shoe.

2. A method as claimed in claim 1 wherein the advancing of the strip is effected at least partially by rotating the mandrel while confining the strip in the cylindrical shape and preventing rotation thereof, the mandrel having helical driving means thereon for advancing the strip.

3. A method as claimed in claim 1 wherein the curing of the binder is effected by passing hot air through the wool of the formed strip.

4. A method as claimed in claim 3 wherein hot air is supplied to both the interior and the exterior of the formed strip.

5. A method as claimed in claim 3 wherein the exterior of the formed strip is skin cured by contact with an electrically heated ring before the passing of the hot air through the wool of the formed strip.

6. A method as claimed in claim 5 wherein the edges of the formed strip are skin cured by contact with a blade joined to the electrically heated ring.

7. A method as claimed in claim 1 including spraying a silicone lubricant and release agent on the strip before it enters the forming shoe.

8. A method of continuously producing fibrous glass pipe insulation comprising:

a. continuously advancing an elongated strip of fibrous glass wool between a forming shoe and a mandrel longitudinally of the strip and axially of the mandrel, the wool having uncured binder on glass fibers thereof;

b. continuously forming the strip into a longitudinally split hollow cylindrical shape by advancing it through the forming shoe to form it around the mandrel; and c. continuously advancing the formed strip through a curing chamber wherein the binder is cured while the strip is confined in the cylindrical shape, the advancing of the strip being effected at least partially by rotating the mandrel while confining the strip in the split cylindrical shape and preventing rotation thereof, the mandrel having helical driving means thereon for advancing the strip.

* * * * *